(12) United States Patent
Ozaki et al.

(10) Patent No.: US 6,599,090 B2
(45) Date of Patent: Jul. 29, 2003

(54) COOLING DEVICE, COOLING METHOD, AND ELECTRONIC APPARATUS

(75) Inventors: Yuzo Ozaki, Kanagawa (JP); Yasuhiro Nakai, Aichi (JP); Takashi Sonehara, Nagano (JP); Shigeyuki Hokao, Tokyo (JP); Motoshi Mizoguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/950,595

(22) Filed: Sep. 12, 2001

(65) Prior Publication Data

US 2002/0012228 A1 Jan. 31, 2002

Related U.S. Application Data

(62) Division of application No. 09/453,430, filed on Dec. 2, 1999.

(30) Foreign Application Priority Data

Dec. 4, 1998 (JP) ........................................... 10-345847
Dec. 4, 1998 (JP) ........................................... 10-345849

(51) Int. Cl.[7] ............................................. F04D 29/58
(52) U.S. Cl. ...................................... 415/206; 361/687
(58) Field of Search ................................ 415/175, 176, 415/177, 178 R, 213.1, 214.1, 206; 361/687, 694, 695; 454/184; 62/259.2; 165/121, 122, 126

(56) References Cited

U.S. PATENT DOCUMENTS 5,552,960 A     9/1996 Nelson et al.
5,691,883 A  *  11/1997 Nelson ........................ 165/122
5,828,552 A    10/1998 Ma

OTHER PUBLICATIONS

Patent abstract of Japan, vol. 1999, No. 01, Jan. 29, 1999, Jp 10 289036.

* cited by examiner

Primary Examiner—Edward K. Look
Assistant Examiner—Kimya N McCoy
(74) Attorney, Agent, or Firm—Frommer Lawrence & Haug LLP; William S. Frommer; Matthew K. Ryan

(57) ABSTRACT

A cooling device is provided for cooling the inside of a main body of an electronic apparatus. The electronic apparatus includes the main body having a movable bottom surface portion and a display unit openable/closable relative to the main body. The cooling device is characterized by including means for transmitting an opening/closing angle of the display unit, and means for driving the movable bottom surface portion in accordance with the opening/closing angle of the display unit transmitted by the transmission means, to enlarge the inner space of the main body, thereby cooling the inside of the main body. Another cooling device is disclosed, which includes means for sucking a first gas, means for discharging the first gas sucked by the sucking means, and means for sucking and discharging a second gas by the action of the first gas discharged by the discharging means.

3 Claims, 31 Drawing Sheets

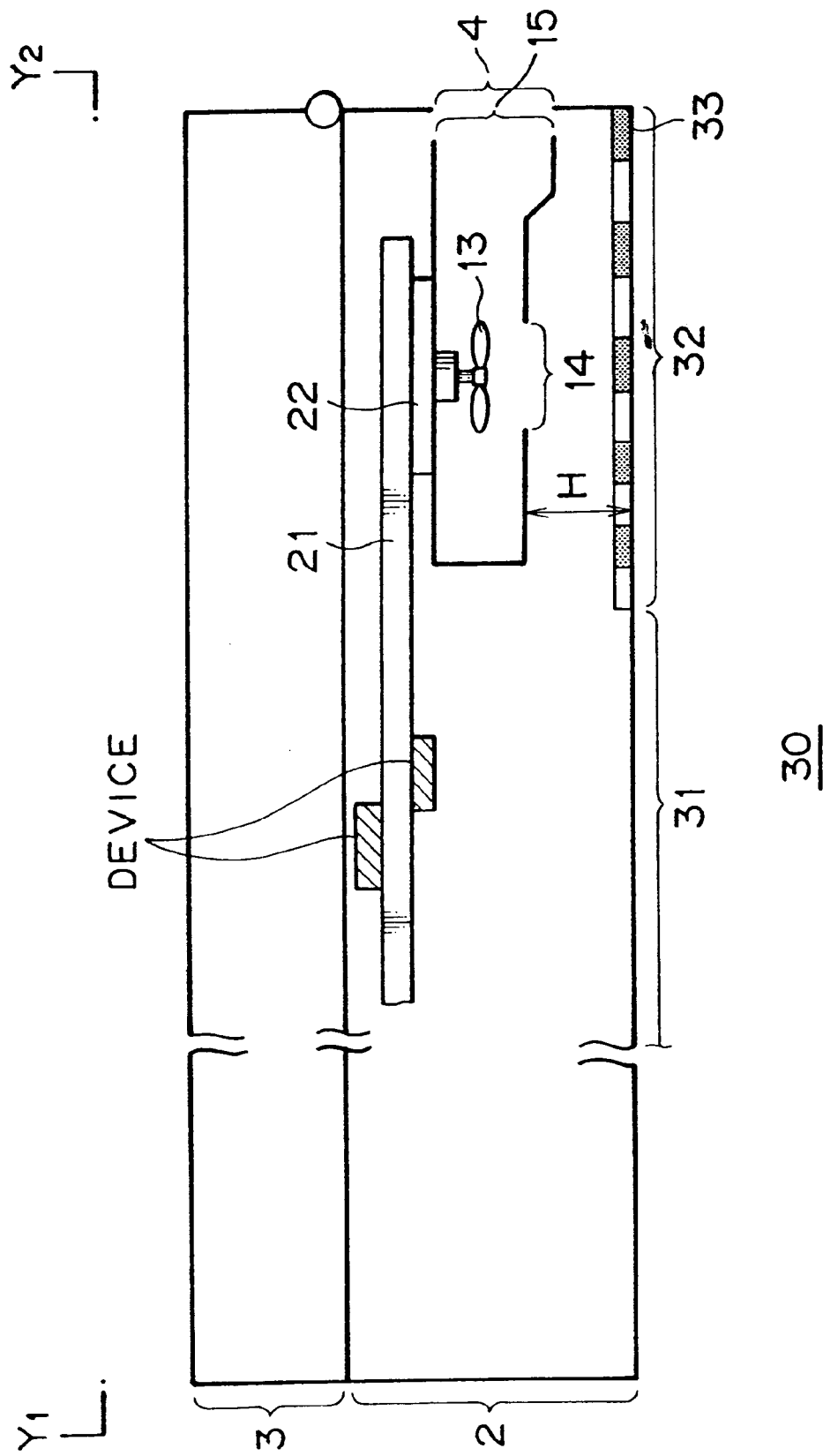

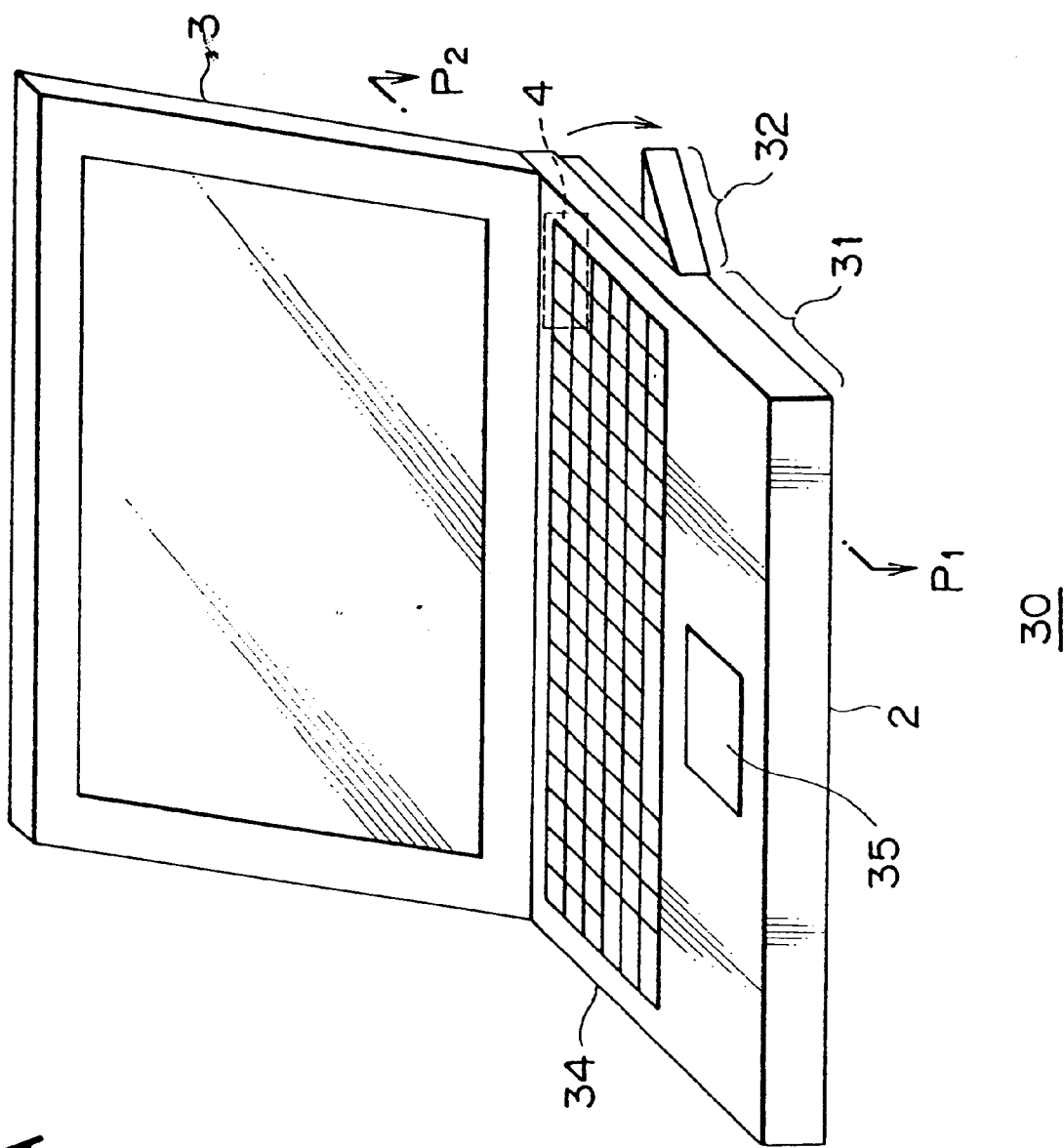

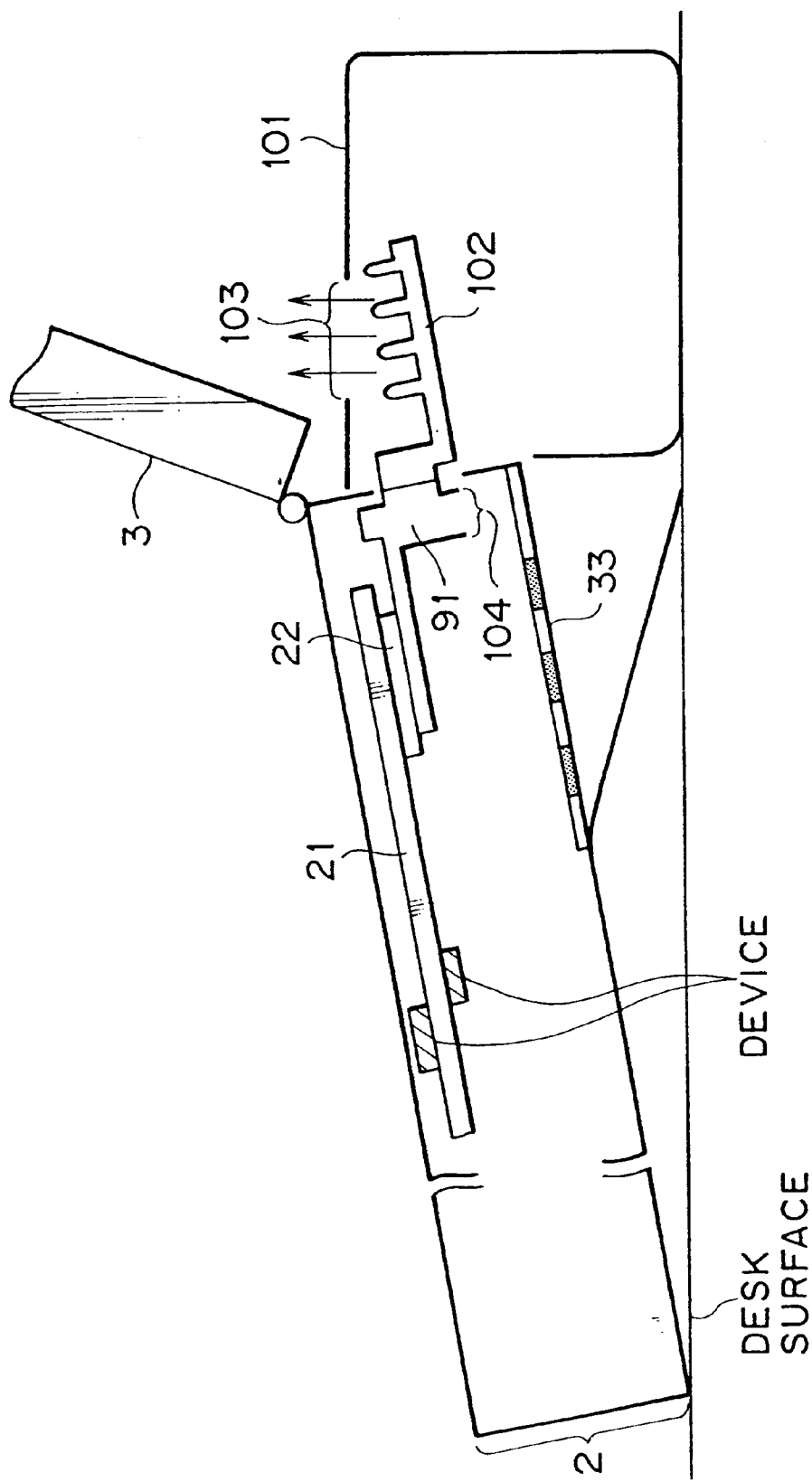

11 (FRONT SURFACE)

FLOW OF HEAT ------------>

FLOW OF HEAT ------------>

11 (BACK SURFACE)

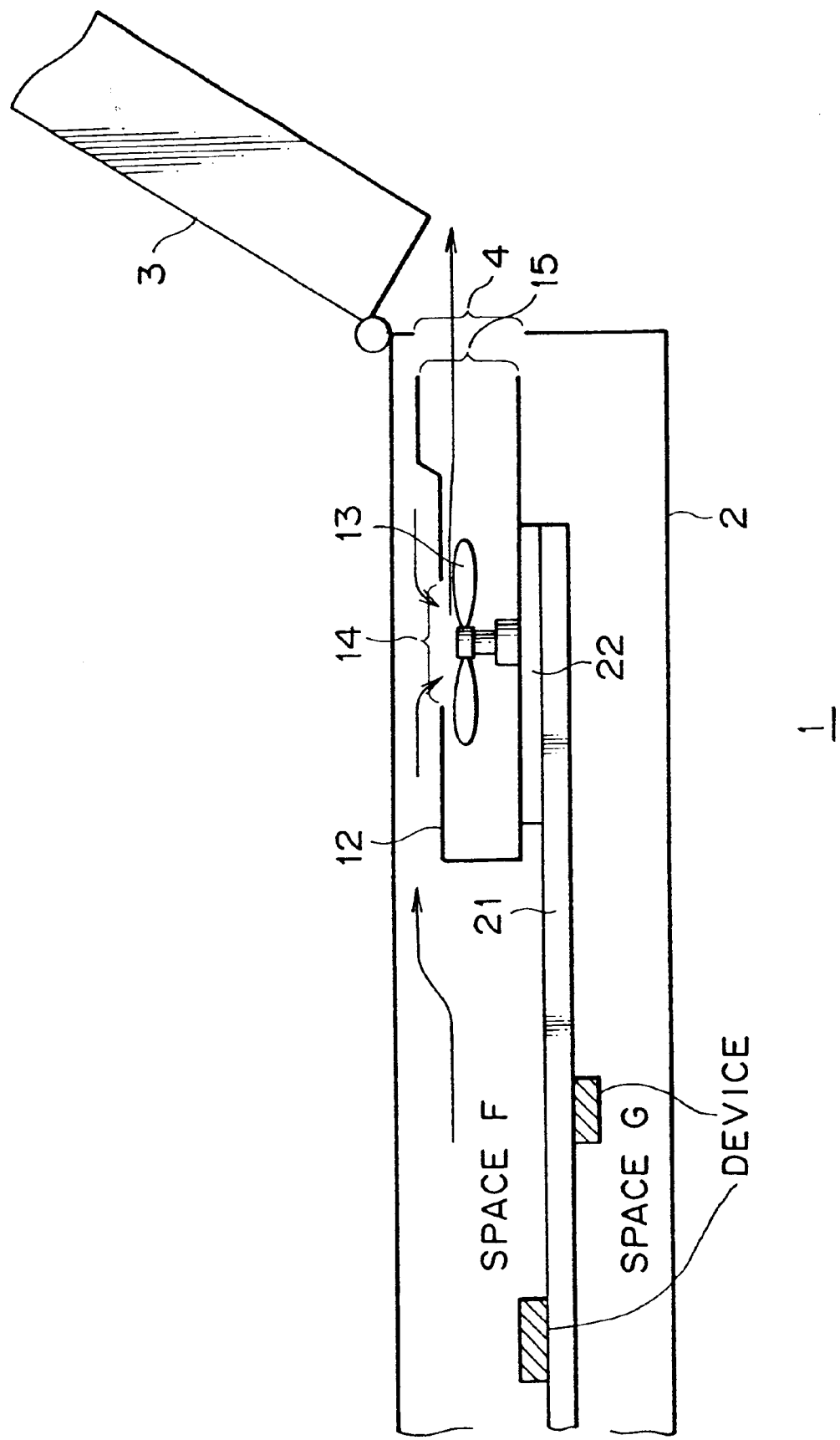

COOLING DEVICE, COOLING METHOD, AND ELECTRONIC APPARATUS

This application is a division of patent application Ser. No. 09/453,430 filed Dec. 2, 1999.

BACKGROUND OF THE INVENTION

The present invention relates to a cooling device, a cooling method therefor, and an electronic apparatus to be cooled by the cooling device, and particularly to a cooling device for cooling the whole inside of a main body of an electronic apparatus, a cooling method therefor, and an electronic apparatus having a main body to be cooled by the cooling device.

FIG. 23 shows a related art personal computer 1 including a main body 2 and a display unit 3. The main body 2 contains devices mounted on a board, such as a CPU and a video chip, which generate heat during operation thereof. To suppress the temperature rise of the whole main body 2, the main body 2 generally has an air outlet 4 disposed typically in the back surface of the main body 2, and also contains a cooling unit 11 shown in FIG. 24. Air in the main body 2, warmed by heat generated from the devices, is discharged to outside through the air outlet 4 by the cooling unit 11.

The cooling unit 11 shown in FIG. 24 has a housing 12 in which a fan 13 is contained. An air inlet 14 through which outside air is sucked by rotation of the fan 13 is provided in the upper surface of the housing 12, and an air outlet 15 through which the air having been sucked from the air inlet 14 is discharged is provided in one side surface of the housing 12.

FIGS. 25A and 25B are front and rear views of the cooling unit 11.

FIG. 26 is a sectional view taken on line $X_1$–$X_2$ of the personal computer 1 shown in FIG. 23. Referring to FIG. 26, the housing 12 of the cooling unit 11 is connected, via a thermal conductor 22 such as a heat pipe, to the board 21 on which the devices such as a CPU and a video chip are mounted. The cooling unit 11 is mounted in such a manner that the air outlet 15 is aligned to the air outlet 4 of the main body 2.

The first cooling function of the cooling unit 11 will be described below. Heat generated from the devices are transferred to the housing 12 of the cooling unit 11 via the board 21 and the thermal conductor 22, to warm air in the housing 12. Since the fan 13 of the cooling unit 11 is rotated to suck outside air from the air inlet 14 and discharge it from the air outlet 15, the warmed air in the housing 12 is discharged to outside via the air outlet 15 of the cooling unit 11 and the air outlet 4 of the main body 2. In this way, the devices as a heat source or the board 21 on which the devices are mounted are cooled by discharging the air in the housing 12, which has been warmed by heat having been transferred via the board 21 and the thermal conductor 22.

The second function of the cooling unit 11 will be described below. The heat from the devices or the board 21 also warms air in a space F, to increase the temperature of the air in the space F. The warmed air in the space F is sucked in the cooling unit 11 from the air inlet 14 and is discharged from the cooling unit 11 to outside via the air outlets 15 and 4 by rotation of the fan 13 of the cooling unit 11. In this way, the space F is cooled by discharging the warmed air in the space F. If a gap between the air inlet 14 of the cooling unit 11 and the inner wall of the main body 2 is broadened, a space G is similarly cooled in accordance with the second cooling function.

The temperature rise of the whole main body 2 is suppressed by cooling respective portions in the main body 2 as described above.

However, along with the miniaturization of the personal computer 1, the main body 2 has come to be thinned, and more concretely the height of the main body 2 has come to be lowered. Accordingly, a gap between the air inlet 14 of the cooling unit 11 and the inner wall of the main body 2 has come to be made narrow. This presents a problem that the air resistance of the gap or the air flow path becomes high and thereby air does not smoothly flow in the gap, with a result that the sucking of air in the cooling unit 11 from the air inlet 14 is insufficient, so that the temperature rise of the main body 2 cannot be sufficiently suppressed.

To allow air in the main body 2 to be sucked in the cooling unit 11 from the air inlet 14 via the air flow path having a high air resistance, it is required to make large the size of the cooling unit 11. As a result, there arises another problem that it is difficult to miniaturize the main body 2.

According to the related art cooling unit 11, air in the space G opposite to the air inlet 24, which is warmed by the heat generated from the devices, is less sucked in the cooling unit 11 from the air inlet 24, and therefore, the warmed air in the space G cannot be sufficiently discharged to outside. As a result, there occurs a further problem that it is difficult to sufficiently suppress the temperature rise of the whole main body 2.

SUMMARY OF THE INVENTION

A first object of the present invention is to provide a cooling device capable of easily discharging air in a main body of an electronic apparatus of even a miniature type in which a gap between an air inlet of the cooling device and the inner wall of the main body is narrow, a cooling method therefor, and an electronic apparatus having a main body to be cooled by the cooling device.

A second object of the present invention is to provide a cooling device capable of discharging air even in a space, opposite to an air inlet of the cooling device, in a main body of an electronic apparatus, a cooling method therefore, and an electronic apparatus having a main body to be cooled by the cooling device.

To achieve the above first object, according to the present invention, there is provided a cooling device for cooling the inside of a main body of an electronic apparatus including said main body having a movable bottom surface portion and a display unit openable/closable relative to said main body, said cooling device including: means for transmitting an opening/closing angle of said display unit; and means for driving said movable bottom surface portion in accordance with said opening/closing angle of said display unit transmitted by said transmission means, to enlarge the inner space of said main body, thereby cooling the inside of said main body.

To achieve the above first object, according to the present invention, there is also provided a cooling method for cooling the inside of a main body of an electronic apparatus including said main body having a movable bottom surface portion and a display unit openable/closable relative to said main body, said method including the steps of: transmitting an opening/closing angle of said display unit; and driving said movable bottom surface portion in accordance with said opening/closing angle of said display unit transmitted at said transmission step, to enlarge the inner space of said main body, thereby cooling the inside of said main body.

To achieve the above first object, according to the present invention, there is also provided an electronic apparatus including a main body having a movable bottom surface portion and a display unit openable/closable relative to said main body, said electronic apparatus including: means for transmitting an opening/closing angle of said display unit; and means for driving said movable bottom surface portion in accordance with said opening/closing angle of said display unit transmitted by said transmission means, to enlarge the inner space of said main body, thereby cooling the inside of said main body.

With the configurations of the above cooling device and the cooling method, since the movable bottom surface portion is driven in accordance with the transmitted opening/closing angle of the display unit to enlarge the inner space of the main body, it is possible to sufficiently cool the inside of the main body.

With the configuration of the above electron apparatus, since the movable bottom surface portion is driven in accordance with the transmitted opening/closing angle of the display unit, to enlarge the inner space of the main body, thereby cooling the inside of the main body, it is possible to effectively utilize the inner space of the main body.

To achieve the above second object, according to the present invention, there is provided a cooling device including: means for sucking a first gas; means for discharging said first gas sucked by said sucking means; and means for sucking and discharging a second gas by the action of said first gas discharged by said discharging means.

To achieve the above second object, according to the present invention, there is also provided a cooling method including the steps of: sucking a first gas; discharging said first gas sucked at said sucking step; and sucking and discharging a second gas by the action of said first gas discharged at said discharging step.

To achieve the above second object, according to the present invention, there is also provided an electronic apparatus including: means for sucking a first gas; means for discharging said first gas sucked by said sucking means; and means for sucking and discharging a second gas by the action of said first gas discharged by said discharging means.

With the configurations of the above cooling device and the cooling method, since a first gas is sucked and discharged, and a second gas is sucked by the action of the discharged first gas, it is possible to cool the entire space around the cooling device.

With the configuration of the above electronic apparatus, since a first gas is sucked by the sucking means and is discharged by the discharging means, and a second gas is sucked by the sucking and discharging means which makes use of the action of the discharged first gas, it is possible to cool the whole inside of the electronic apparatus.

BRIEF DESCRIPTION OF THE DRAWINGS

FIG. 2A is a sectional view taken on line $Y_1$–$Y_2$ of FIG. 1B.

FIG. 3A is a perspective view of an appearance of the personal computer, showing a state in which the display is opened from the main body and the openable bottom surface portion is opened.

FIGS. 16A and 16B are views showing another docking station having a cooling mechanism;

FIG. 26 is a sectional view taken on line $X_1$–$X_2$ of the personal computer shown in FIG. 23.

DETAILED DESCRIPTION OF THE PREFERRED EMBODIMENTS

Figure 1A:
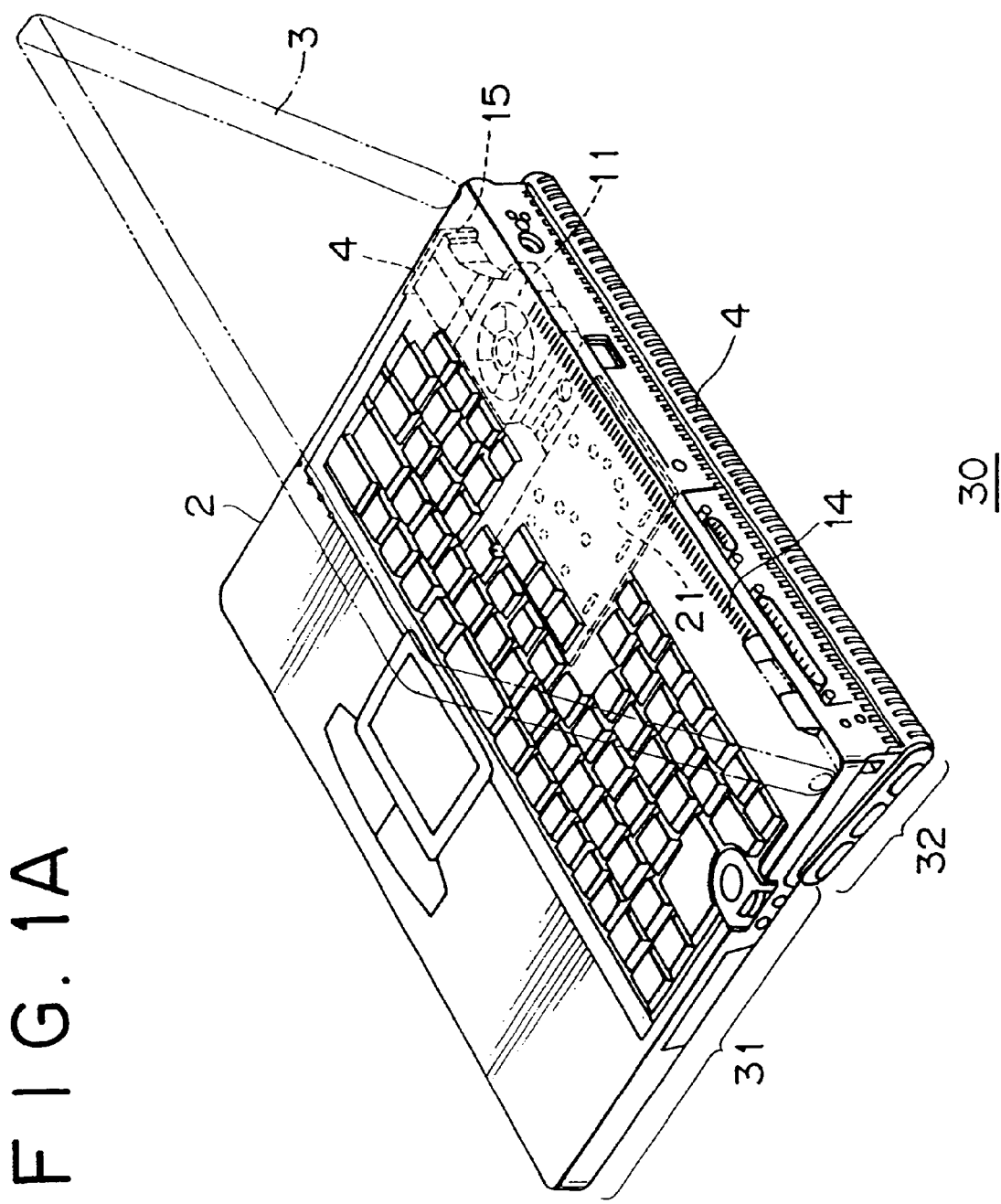
FIG. 1A is a perspective view of an appearance of a personal computer to which the present invention is applied, showing a state in which a display unit is removed from the personal computer.

Prior to description of embodiments of the present invention, in order to make clear the correspondence between means of inventions described in claims and parts appearing in the embodiments, there will be described the features of the inventions with the parts corresponding to the means put in parentheses after the means. However, such description of the parts put in the parentheses is illustrative purposes only, and it is to be understood that the means of the inventions are not limited to the parts put in the parentheses.

A cooling device described in claim 1 includes: means (for example, a cam 62 shown in FIG. 9) for transmitting an opening/closing angle of the display unit; and means (for example, a hinge 63 shown in FIG. 9) for driving the movable bottom surface portion (for example, an openable bottom surface portion 32 shown in FIG. 3A) in accordance with the opening/closing angle of the display unit transmitted by the transmission means, to enlarge the inner space of the main body, thereby cooling the inside of the main body.

An electronic apparatus includes: means (for example, a cam 62 shown in FIG. 9) for transmitting an opening/closing angle of the display unit; and means (for example, a hinge 63 shown in FIG. 9) for driving the movable bottom surface portion (for example, an openable bottom surface portion 32 shown in FIG. 3A) in accordance with the opening/closing angle of the display unit transmitted by the transmission means, to enlarge the inner space of the main body, thereby cooling the inside of the main body.

A cooling device includes means (for example, an air inlet 24 shown in FIGS. 17A and 17B) for sucking a first gas; means (for example, an air outlet 25 shown in FIGS. 17A and 17B) for discharging the first gas sucked by the sucking means; and means (for example, an air inlet 43 shown in FIGS. 17A and 17B) for sucking and discharging a second gas by the action of the first gas discharged by the discharging means.

An electronic apparatus includes means (for example, an air inlet 24 shown in FIGS. 17A and 17B) for sucking a first gas; means (for example, an air outlet 25 shown in FIGS. 17A and 17B) for discharging the first gas sucked by the sucking means; and means (for example, an air inlet 43 shown in FIGS. 17A and 17B) for sucking and discharging a second gas by the action of the first gas discharged by the discharging means.

First Embodiment

Figure 1B:
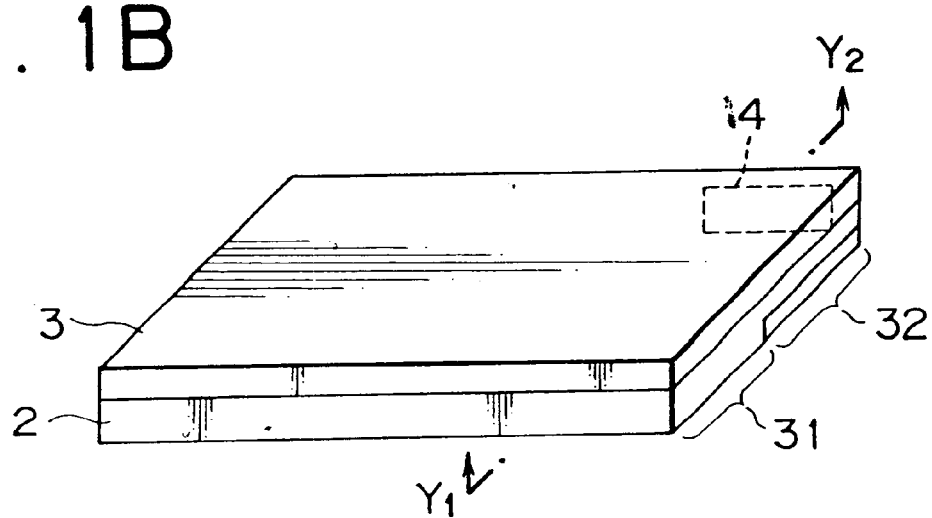
FIGS. 1B and 1C are perspective views of an appearance of the personal computer, showing a state in which the display unit is closed onto a main body.
Figure 1C:
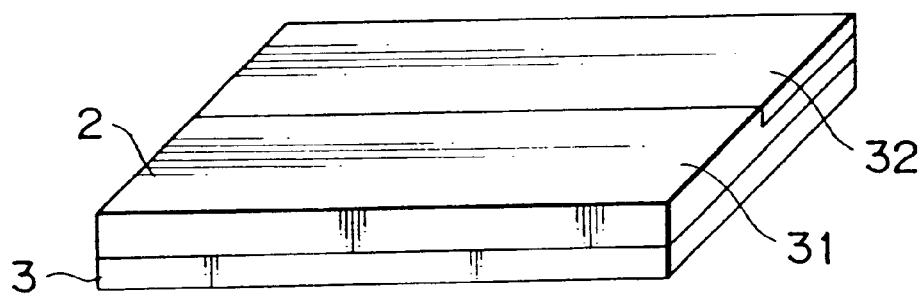
Figure 23:
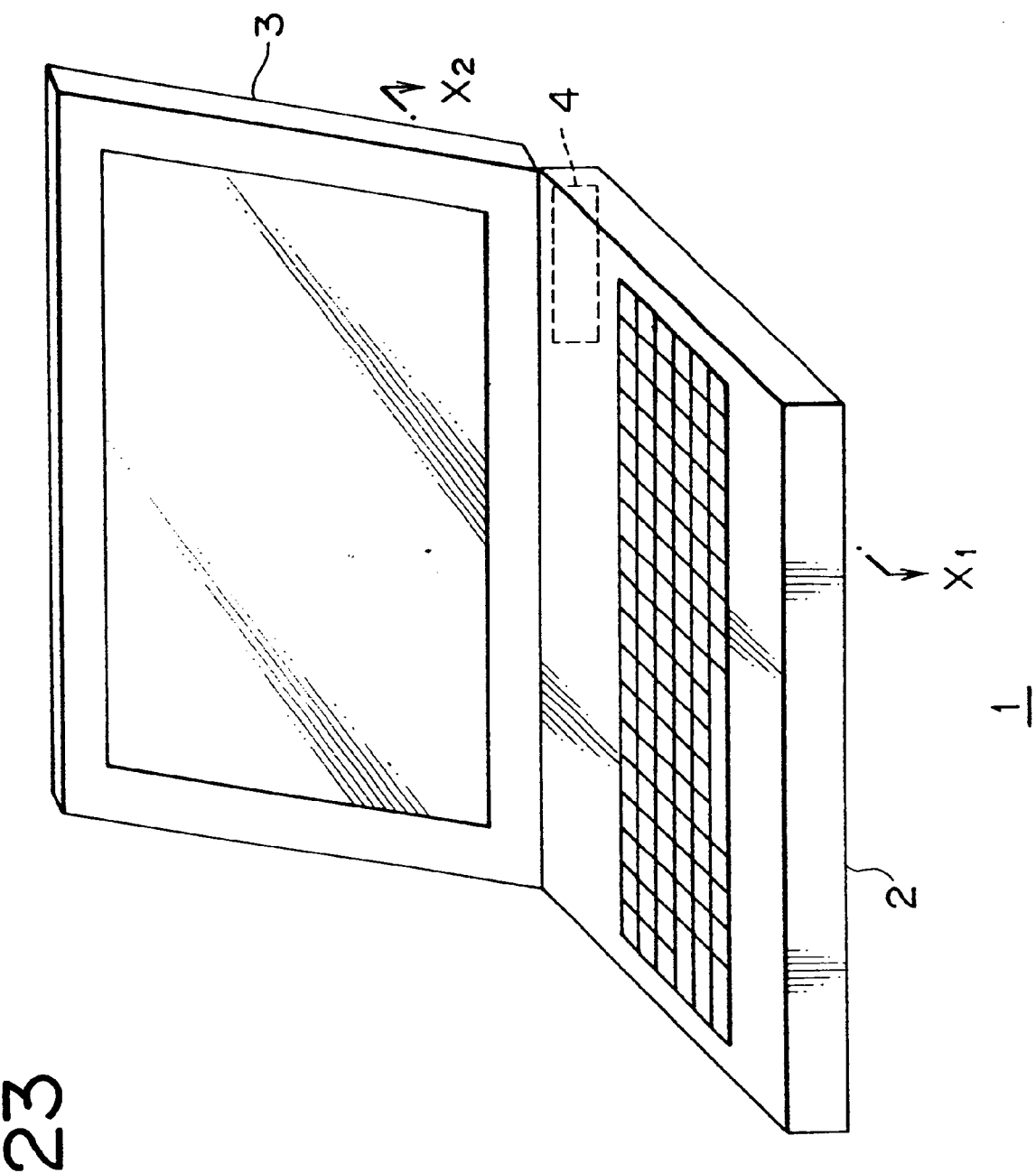
FIG. 23 is a configuration view of an appearance of a related art personal computer.

FIG. 1A is a perspective view, seen along a direction extending obliquely from above, of an appearance of a personal computer 30 to which the present invention is applied, showing a state in which a display unit 3 is removed from the personal computer 30; FIG. 1B is a perspective view, seen along a direction extending obliquely from above, of an appearance of the personal computer 30, showing a state in which the display unit 3 is closed onto a main body 2; and FIG. 1C is a perspective view, seen along a direction extending obliquely from below, of an appearance of the personal computer 30, showing a state in which the display unit 3 is closed onto the main body 2. In these figures, parts corresponding to those shown in FIG. 23 are designated by the same characters and the overlapped description thereof is omitted.

Referring to FIGS. 1A to 1C, the bottom surface portion of the main body 2 is divided into a fixed bottom surface portion 31, and an openable bottom surface portion 32 opened/closed along with opening/closing of the display unit 3. In a state in which the display unit 3 is closed onto the main body 2, the openable bottom surface portion 32 is closed.

Figure 2B:
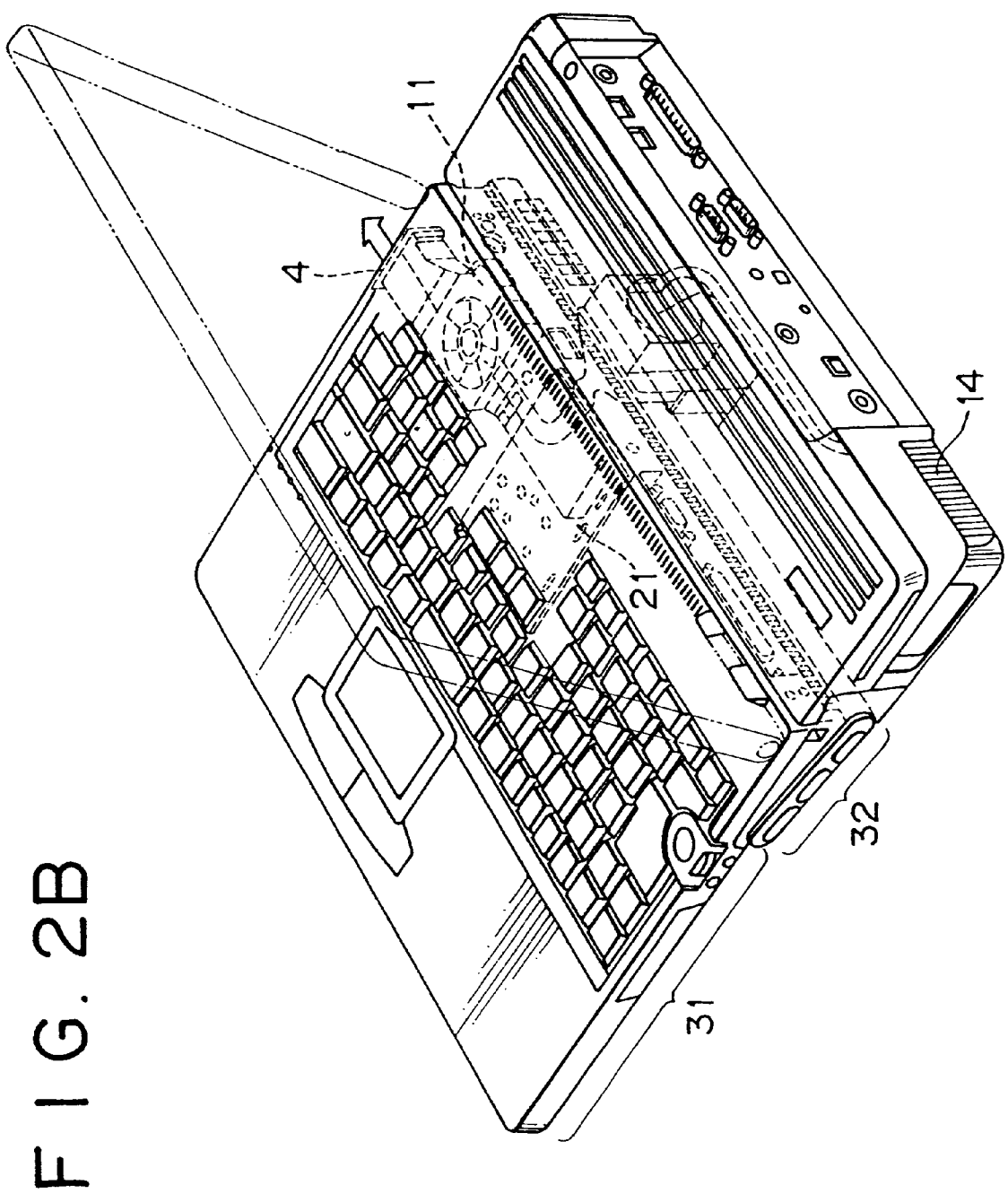
FIG. 2B is a view showing a mounting state of the cooling unit.
Figure 24:
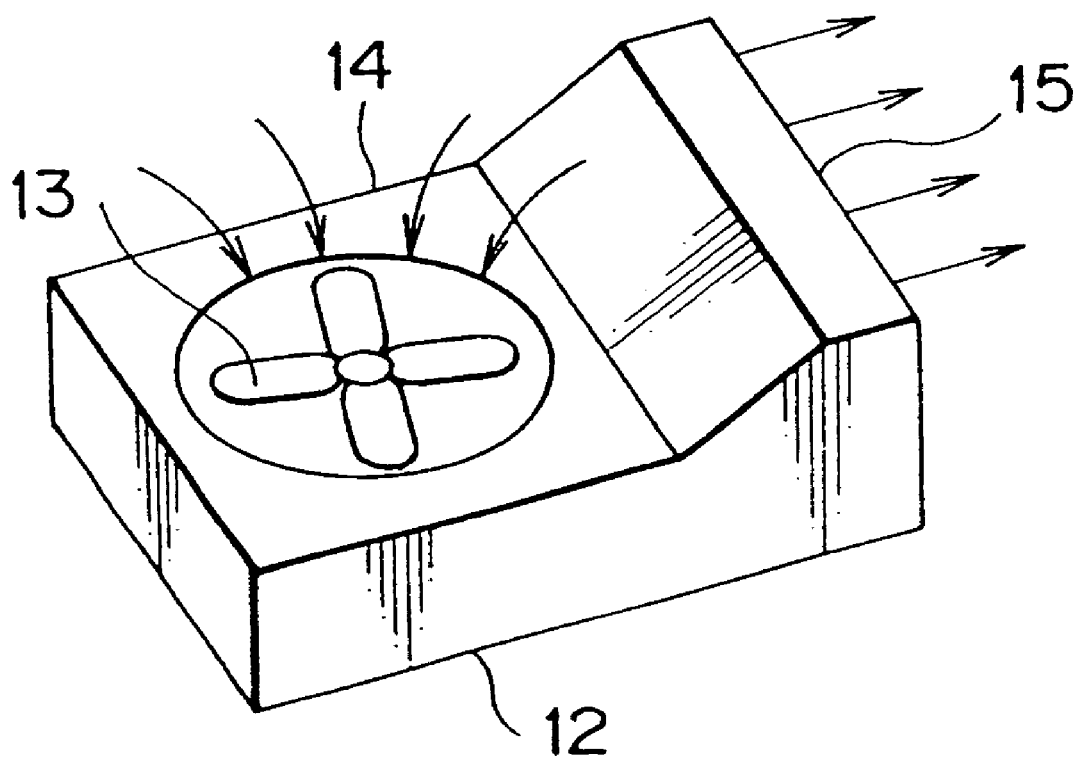
FIG. 24 is a configuration view of an appearance of a related art cooling unit.
Figure 25A:
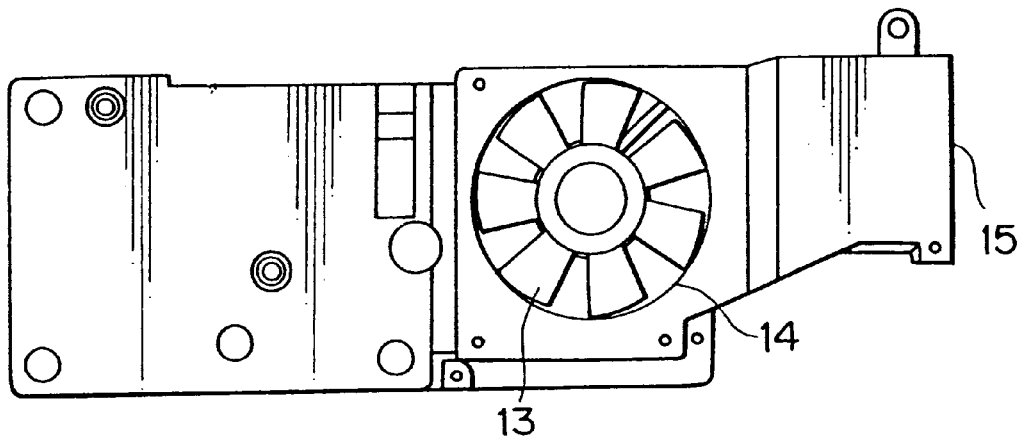
FIGS. 25A and 25B are front and rear views of the cooling unit shown in FIG. 24, respectively.
Figure 25B:
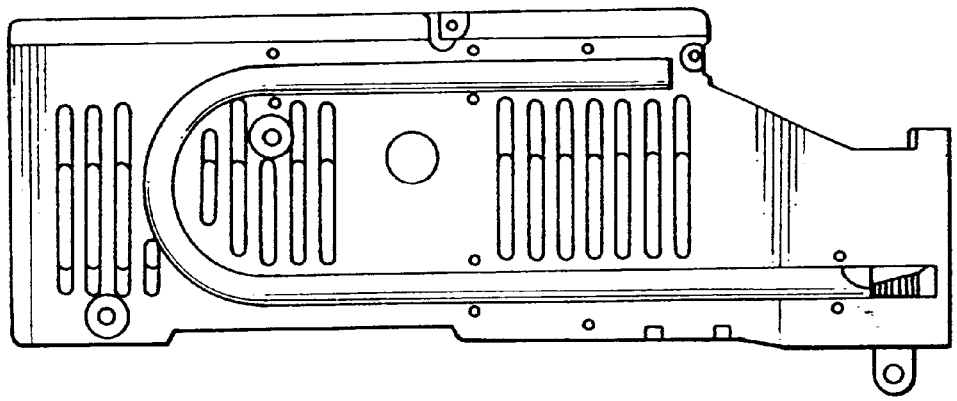

FIG. 2A is a sectional view taken on line $Y_1$–$Y_2$ of FIG. 1B. The same cooling unit 11 as that shown in FIG. 24 is mounted in the main body 2 as shown in FIG. 2A. The mounting state of the cooling unit 11 is also shown in FIG. 2B. To be more specific, the cooling unit 11 is mounted such that an air outlet 15 is aligned to an air outlet 4 of the main body 2 and an air inlet 14 is directed downwardly to be aligned to the openable bottom surface portion 32. Reference numeral 33 designates a net which allows air to pass therethrough but does not allow outside refuse to pass therethrough.

Figure 3B:
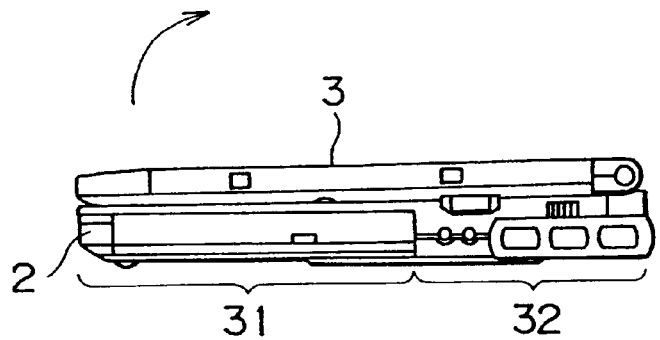
FIGS. 3B to 3D are views illustrating the action of the openable bottom surface portion.
Figure 3C:
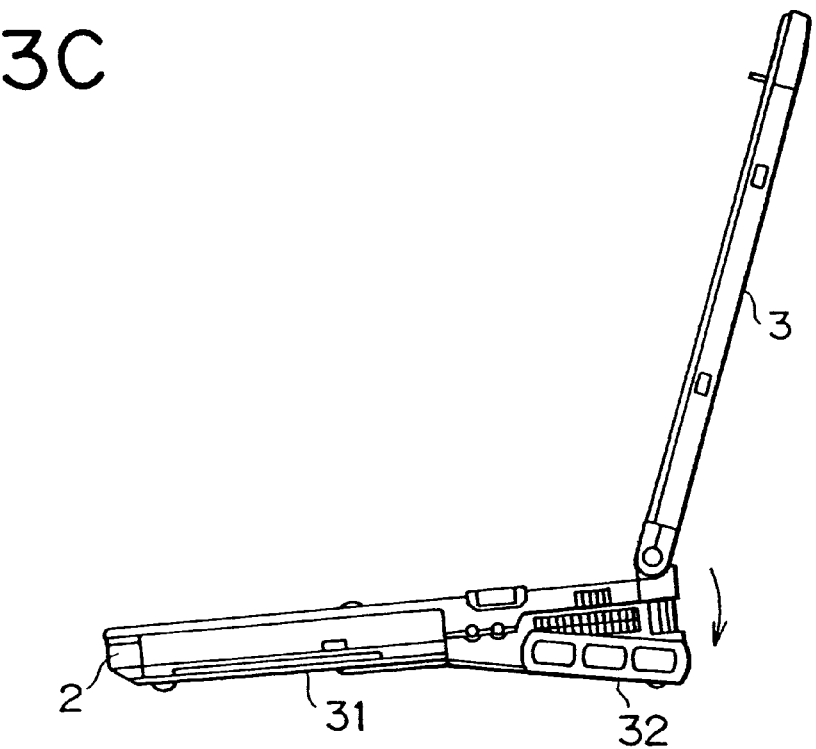
Figure 3D:
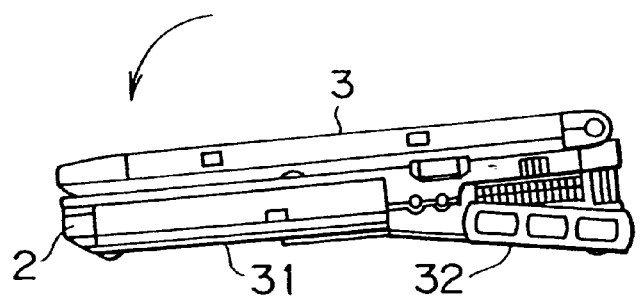

FIG. 3A is a perspective view of an appearance of the personal computer 30, showing a state in which the display 3 is opened from the main body 2 and the openable bottom surface portion 32 is opened; and FIGS. 3B to 3D are views illustrating the action of the openable bottom surface portion 32. Referring to FIG. 3A, a key board 34 operated for inputting characters and symbols and a track pat 35 operated for moving a mouse cursor are provided on the upper surface of the main body 2.

Figure 4:
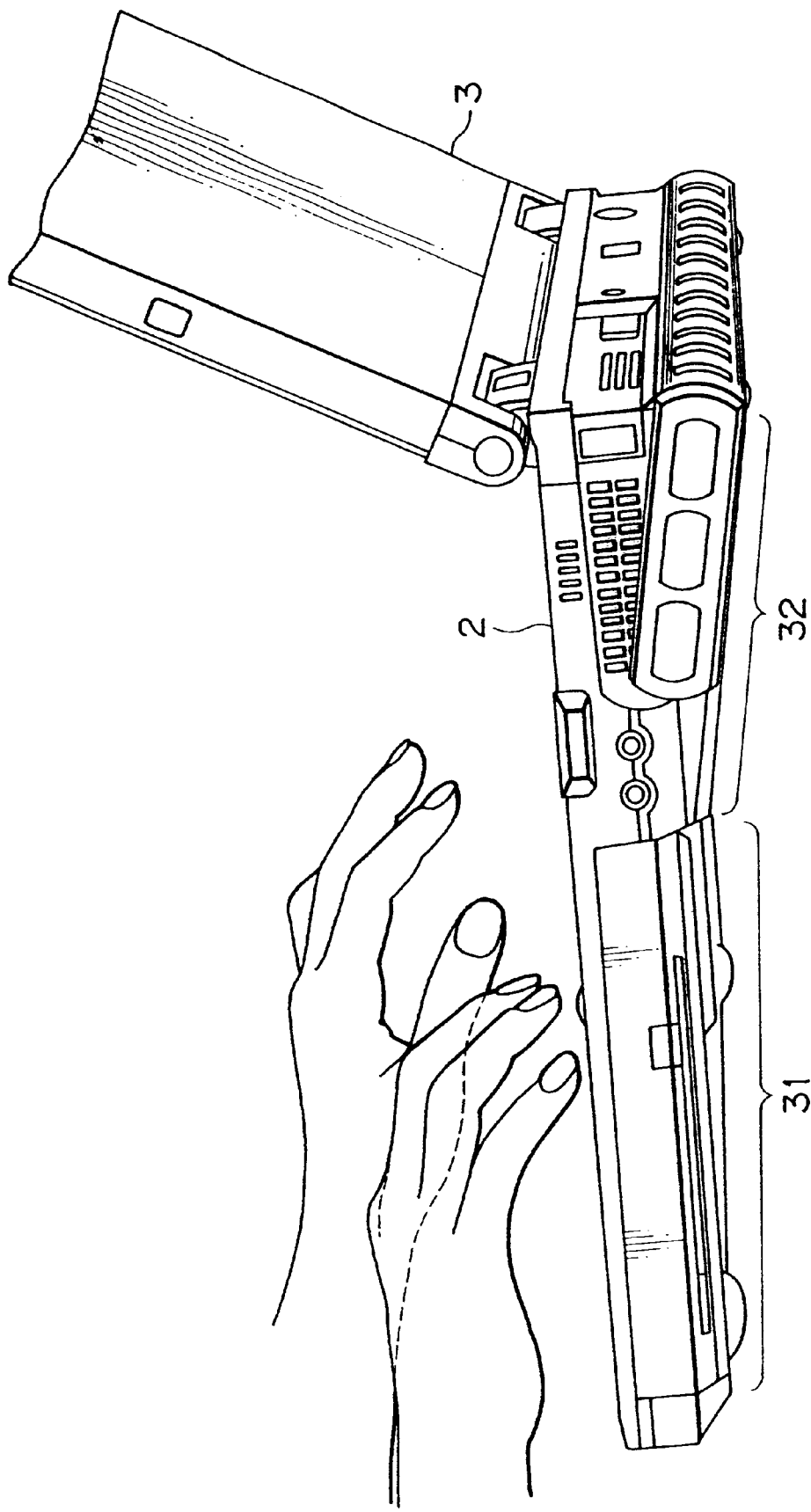
FIG. 4 is a view showing a state in which the personal computer is placed on knees of a user with the openable bottom surface portion opened.

As shown in FIG. 4, when operated, the personal computer 30 is placed on knees of a user in a state in which the openable bottom surface portion 32 is opened.

Figure 5A:
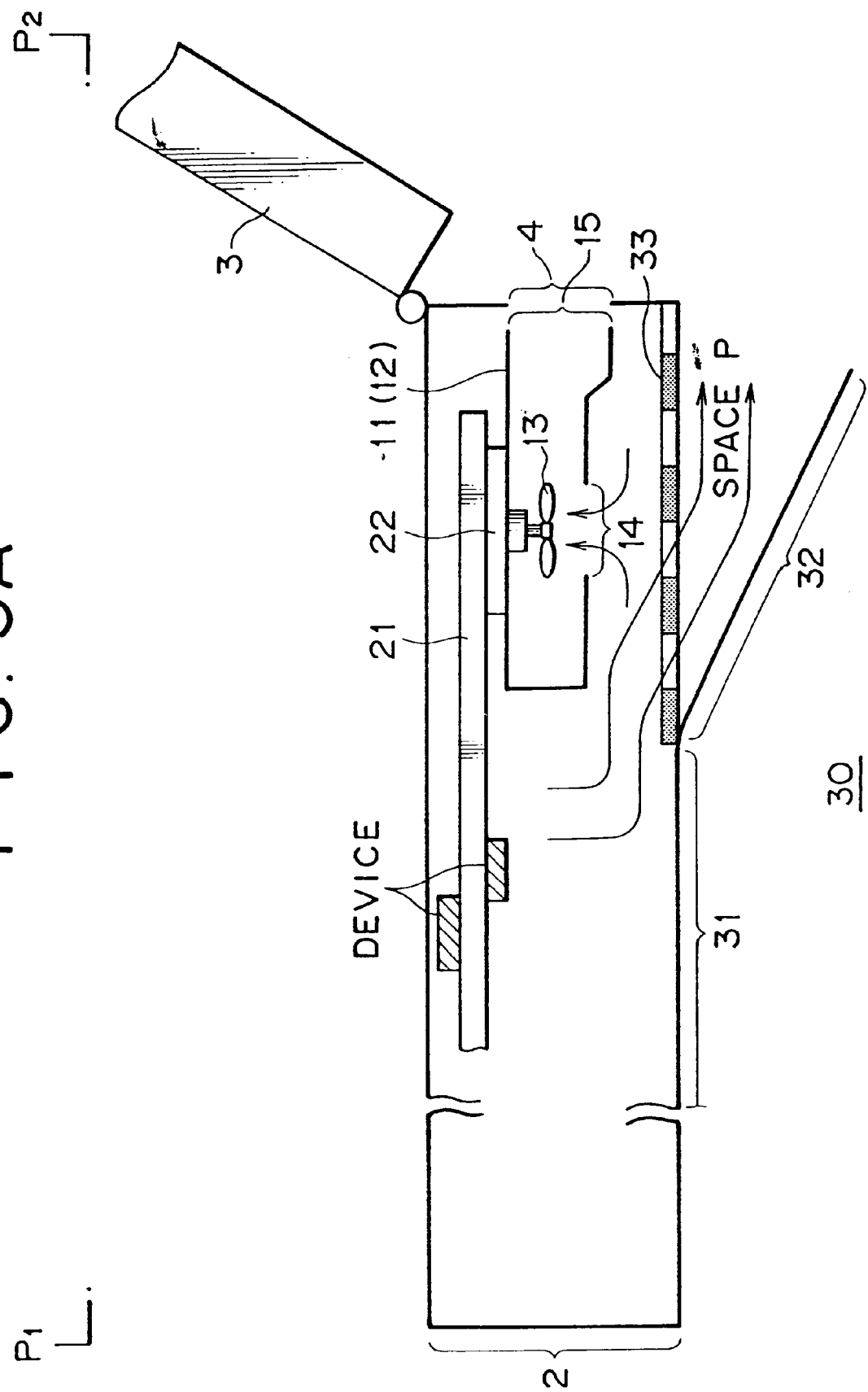
FIG. 5A is a sectional view taken on line $P_1$–$P_2$ of FIG. 3A, and FIGS. 5B and 5C are views illustrating the function of cooling the inside of the main body.

FIG. 5A is a sectional view taken on line $P_1$–$P_2$ of FIG. 3A. Referring to FIG. 5A, when the openable bottom surface portion 32 is opened, a large space P is formed between the air inlet 14 of the cooling unit 11 and the openable bottom surface portion 32. It should be noted that the opening/closing mechanism of the openable bottom surface portion 32 will be described in detail later.

Figure 5B:
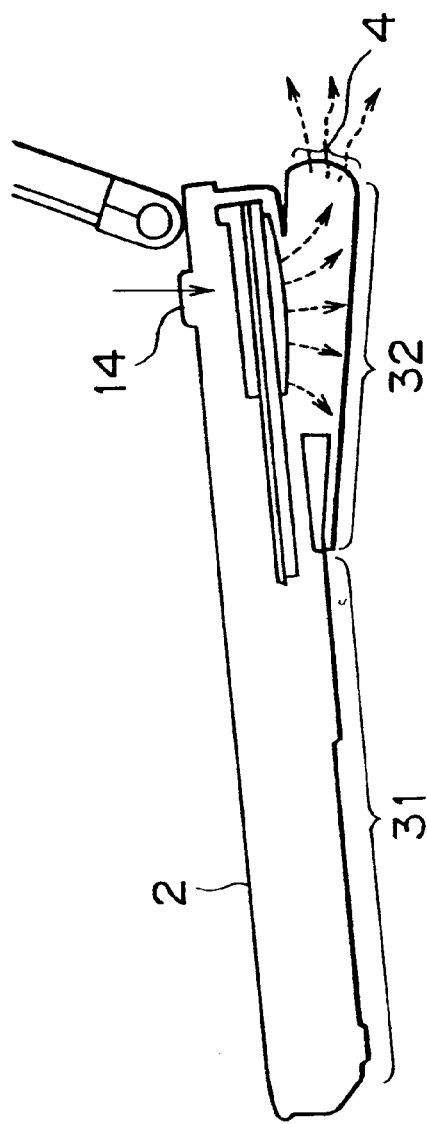
Figure 5C:
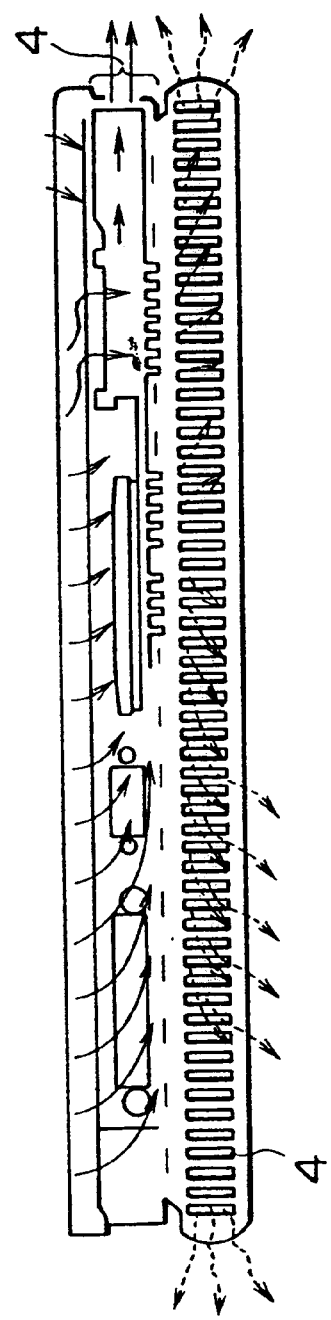

The function of cooling the inside of the main body 2 in the state shown in FIG. 5A will be described with reference to FIGS. 5B and 5C. As described above, when the display 3 is opened, the openable bottom surface portion 32 is opened, to obtain the large space P, taken as an air flow path having a small air resistance, on the main body 2 side of the air inlet 14. As a result, air can be sufficiently sucked in the cooling unit 11 from the air inlet 14, and further, heat generated from devices or the like can be naturally released in the space P.

In this way, the temperature rise of the whole main body 2 can be sufficiently suppressed by opening part of the bottom surface, that is, the openable bottom surface portion 32 of the main body 2.

The openable bottom surface portion 32 exhibits another advantage; namely, since the openable bottom surface portion 32 is opened, it is not required to ensure a space between the air inlet 14 of the cooling unit 11 and the main body 2, for example, a space having a height H shown in FIG. 2A, and accordingly, the space in the main body 2 can be efficiently used.

A further advantage of the openable bottom surface portion 32 is that when a user operates the personal computer 30, part of the openable bottom surface portion 32 comes into contact with the knees of the user, that is, the whole bottom surface of the main body 2 is not brought into contact with the knees of the user, with a result that the discomfort of the user due to temperature rise of the main body can be reduced. Additionally, when a user operates the personal computer 30, since the openable bottom surface portion 32 is opened, the main body 2 is tilted forwardly, to thereby enhance the operability of the key board 34.

Figure 6:
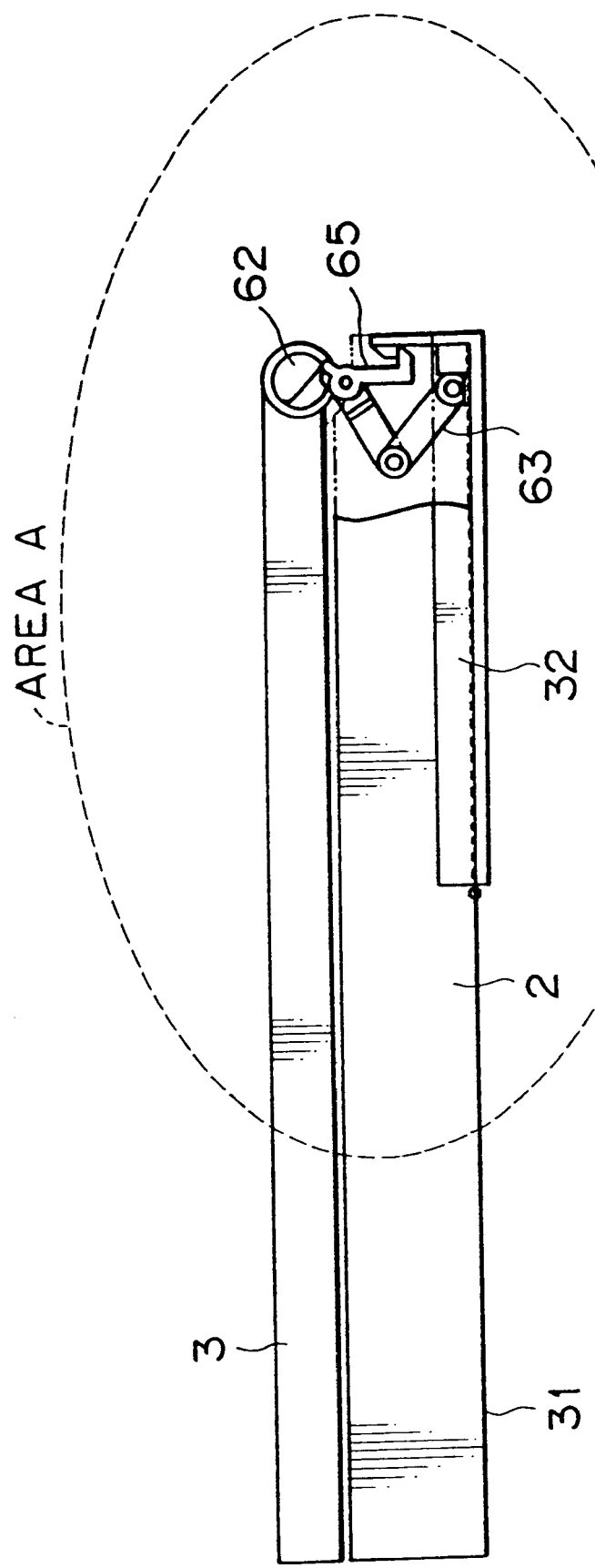
FIG. 6 is a right side view of the personal computer, showing a state in which the display unit is closed onto the main body.
Figure 7:
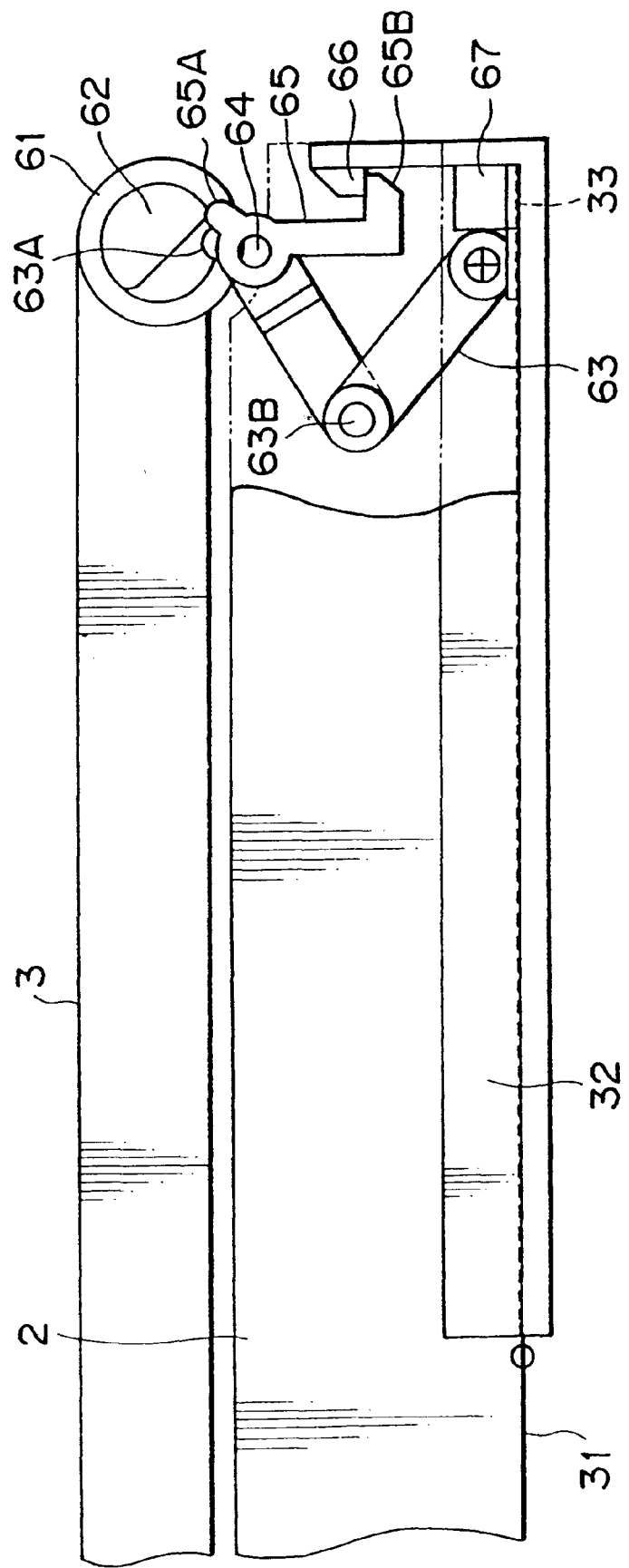
FIG. 7 is an enlarged view of an area A shown in FIG. 6.

The mechanism of opening the openable bottom surface portion 32 will be described below. FIG. 6 is a right side view showing a state in which the display unit 3 is closed onto the main body 2, and FIG. 7 is an enlarged view of an area A shown in FIG. 6. Referring to FIG. 7, a cam 62 is mounted to a rotational shaft 61 rotated along with opening/closing of the display unit 3. One end, on which a projection 63A is formed, of a hinge 63 is connected to an end portion rotational shaft 64, and the other end of the hinge 63 is connected to the openable bottom surface portion 32. One end, on which a projection 65A is formed, of a lever 65 is connected to the end portion rotational shaft 64, and the other end, configured as a key portion 65B, of the lever 65 is latched by a lock portion 66. A release button 67 is contained in the main body 2 in a state being placed on the upper surface of the net 33.

Figure 8:
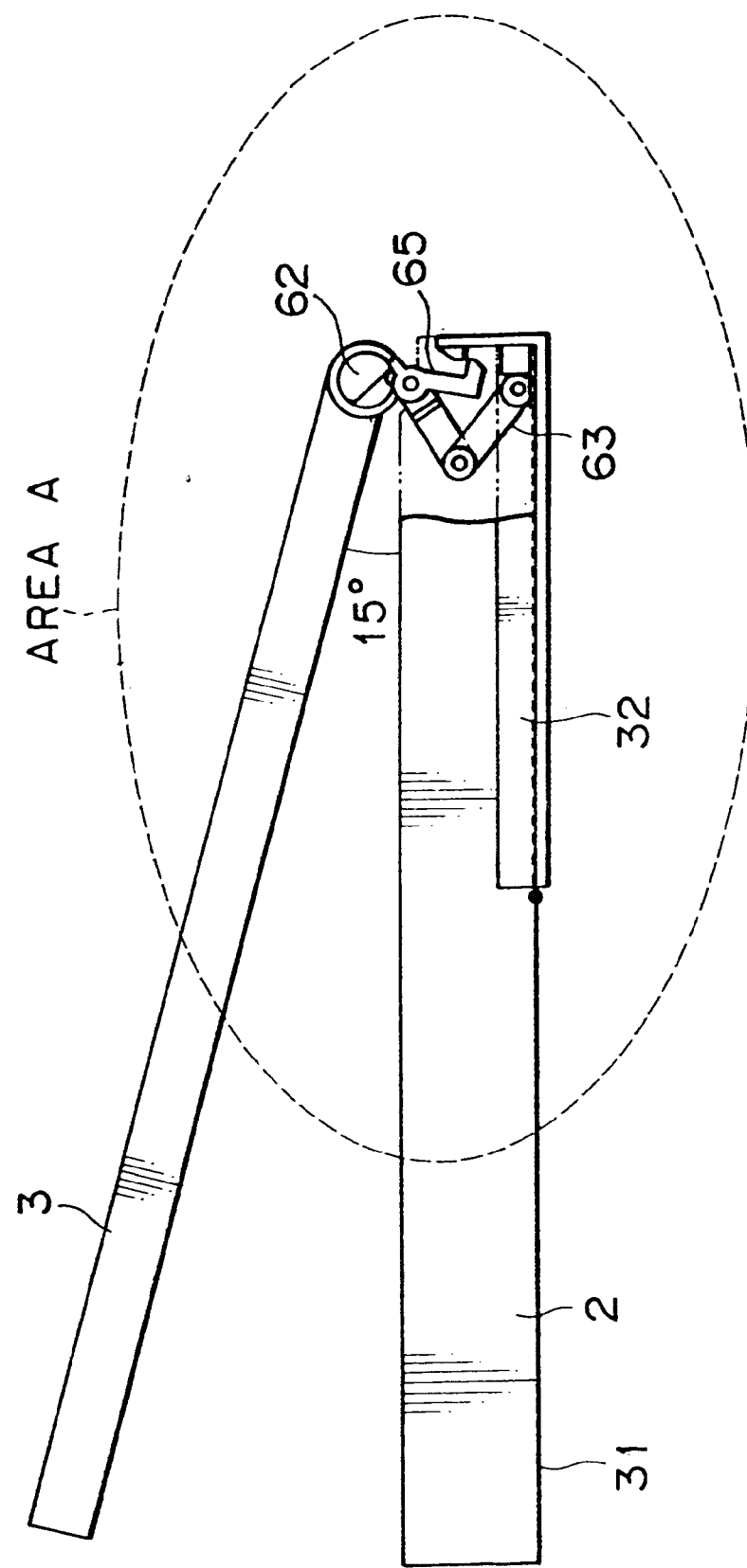
FIG. 8 is another right side view of the personal computer, showing a state in which the display unit is opened at about 15°.
Figure 9:
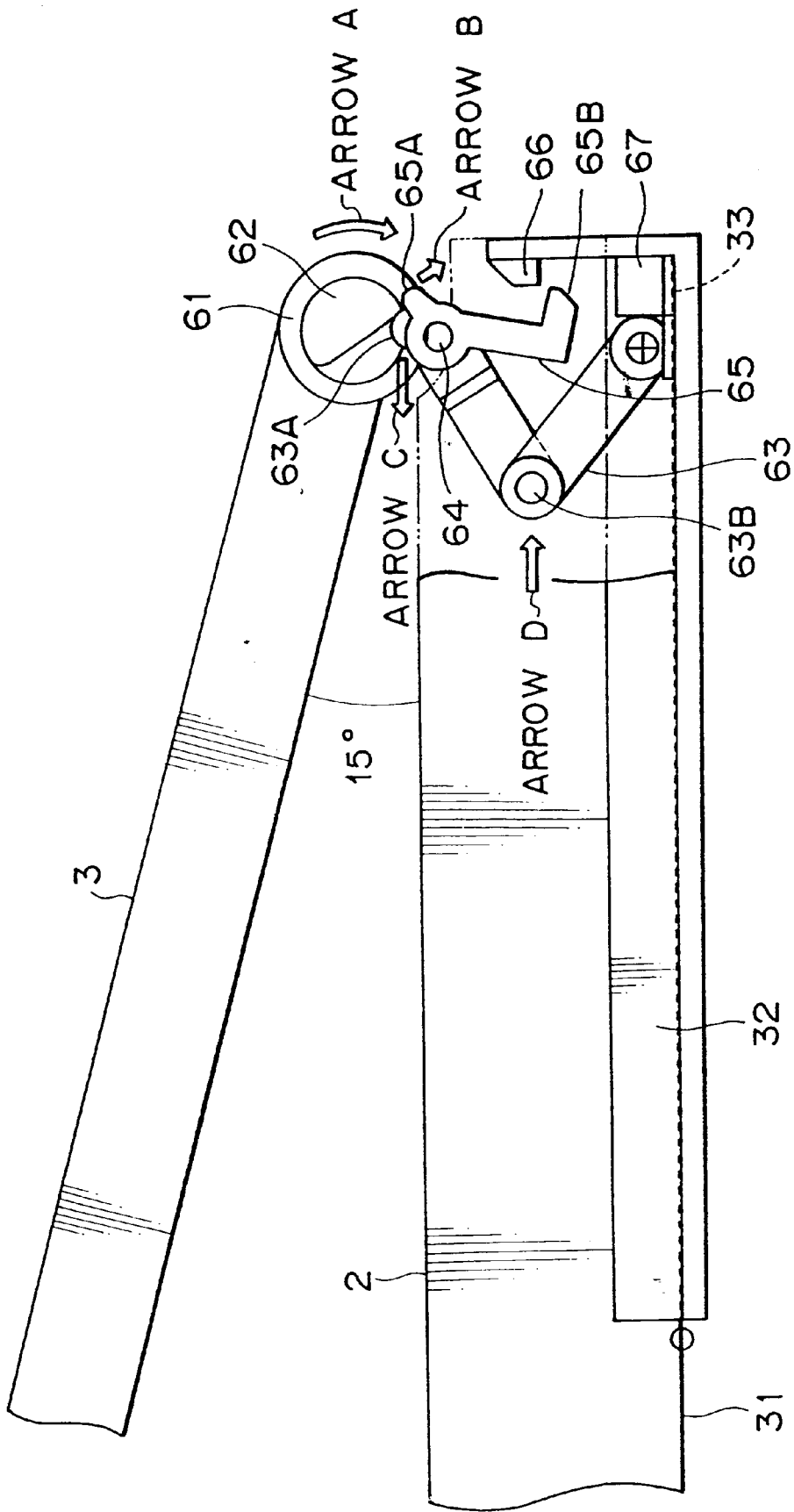
FIG. 9 is an enlarged view of an area A shown in FIG. 8.

When the display unit 3 is opened at about 150 from the state shown in FIG. 6 to be in a state shown in FIG. 8, as shown in FIG. 9 which is an enlarged view of an area A shown in FIG. 8, the cam 62 is rotated in the direction shown by an arrow A. At this time, the projection 65A of the lever 65 is driven in the direction shown by an arrow B and thereby the key portion 65B is separated, that is, unlatched from the lock portion 66, and simultaneously the projection 63A of the hinge 63 is driven in the direction shown by an arrow C and thereby a hinge shaft 63B is moved in the direction shown by an arrow D.

Figure 10:
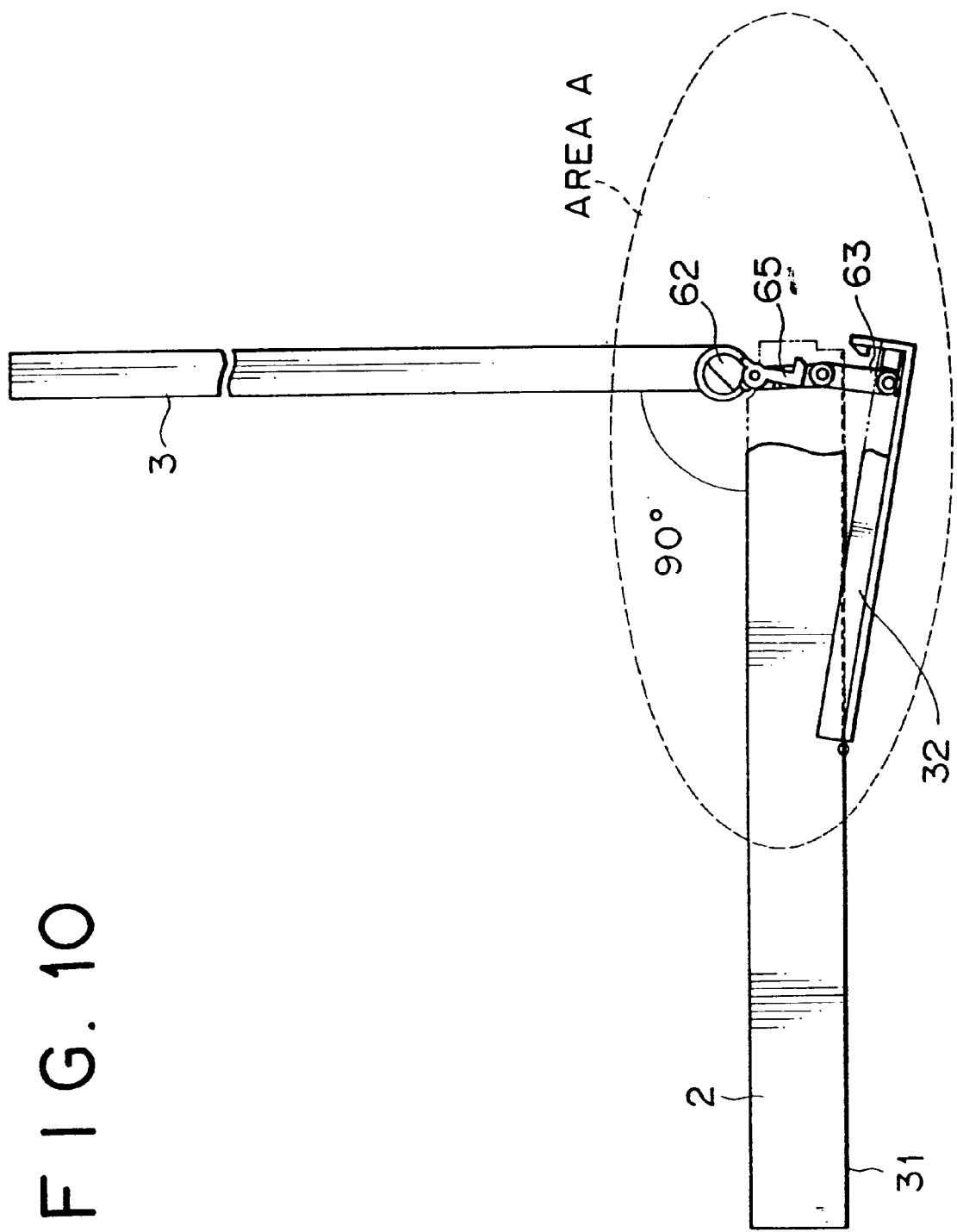
FIG. 10 is a further right side view of the personal computer, showing a state in which the display unit is opened at about 90°.
Figure 11:
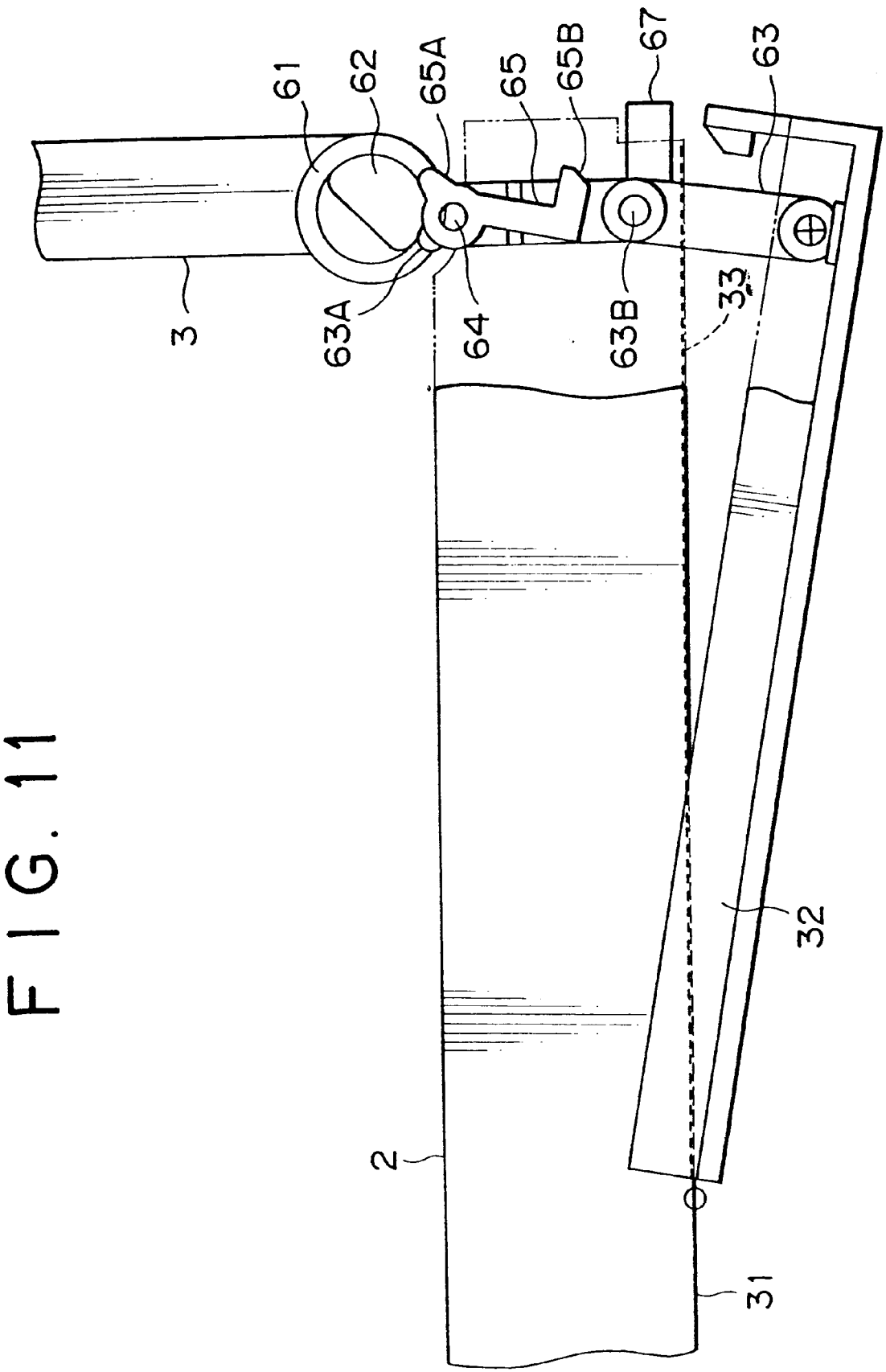
FIG. 11 is an enlarged view of an area A shown in FIG. 10.

When the display unit 3 is opened at about 90° from the state shown in FIG. 6 to be in a state shown in FIG. 10, as shown in FIG. 11 which is an enlarged view of an area A shown in FIG. 10, the hinge 63 is full extended in the vertical direction. At this time, the release button 67 contained in the main body 2 is pushed out of the main body 2 by the hinge shaft 63B.

When the openable bottom surface portion 32 becomes once such a state in which the hinge 63 is full extended, the projection 63A of the hinge 63 is not driven in any direction. For example, even when the display unit 3 is opened at an angle of 90° or more, the state in which the openable bottom surface portion 32 is opened as shown in FIGS. 10 and 11 is kept. Further, even when the display unit 3 is closed from the state in which the hinge 63 is full extended to a state shown in FIG. 12, the openable bottom surface portion 32 remains open like the above case described with reference to FIGS. 10 and 11.

Figure 12:
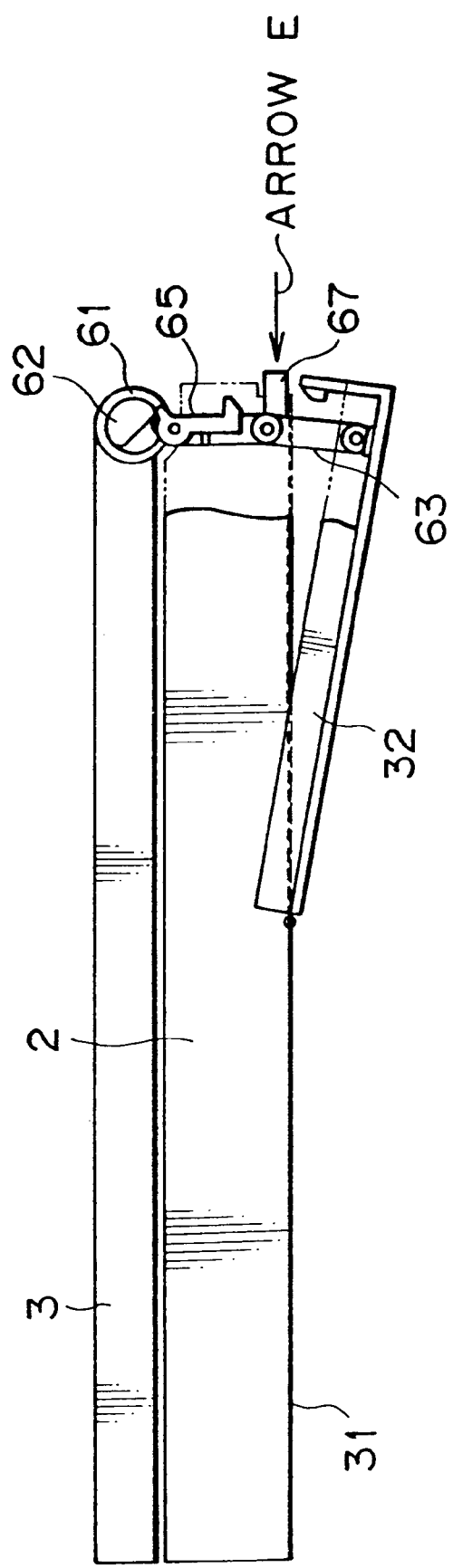
FIG. 12 is a further right side view of the personal computer, showing a state in which a release button is pushed inwardly by a user.
Figure 13:
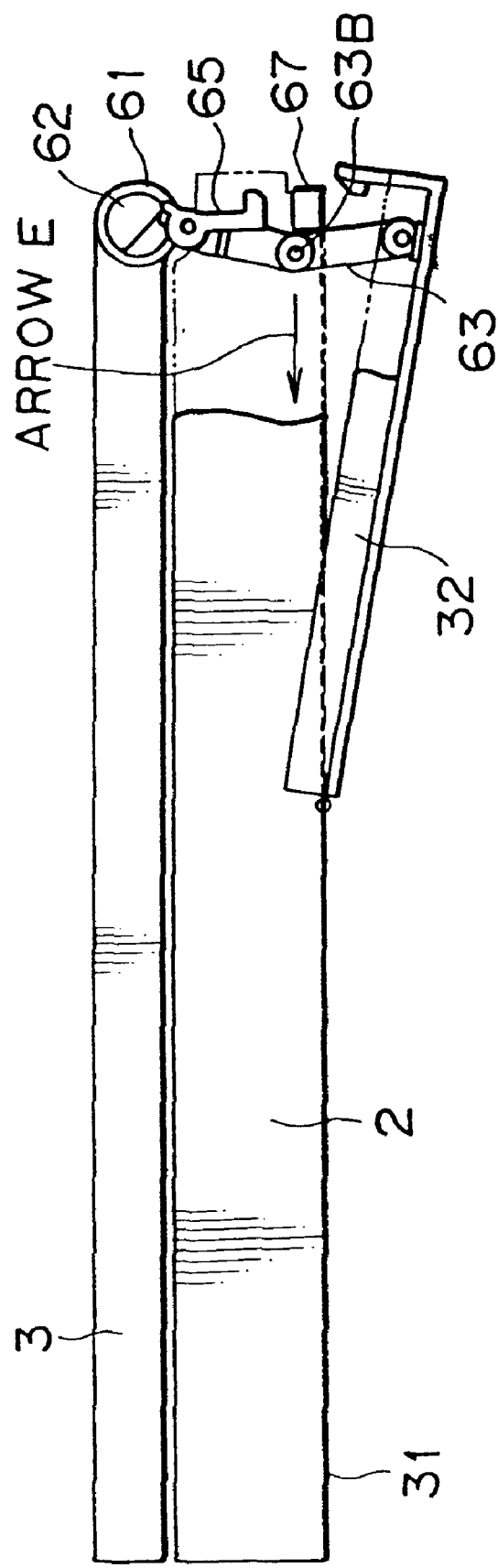
FIG. 13 is a further right side view of the personal computer, showing a state in which the openable bottom surface portion is moved upwardly.
Figure 14:
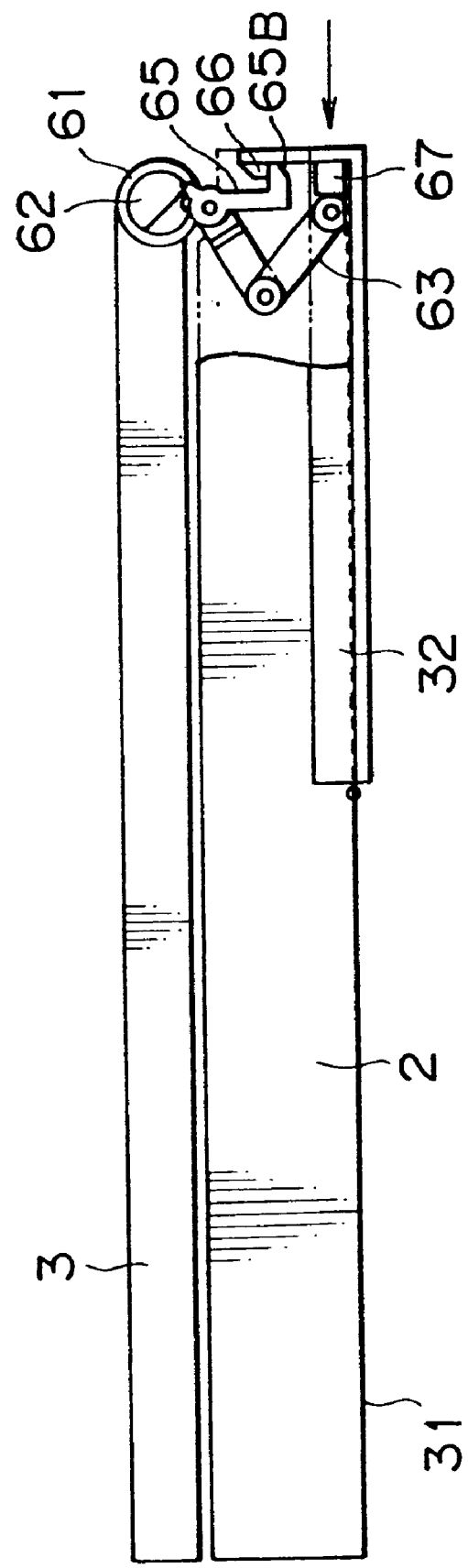
FIG. 14 is a further right side view of the personal computer, showing a state in which the openable bottom surface portion is closed.

The mechanism of closing the openable bottom surface portion 32 will be described below. When the released button 67 is pushed inwardly by the user in the state in which the display unit 3 is closed as shown in FIG. 12, as shown in FIG. 13, the hinge shaft 63 is moved in the direction shown by an arrow E and thereby the openable bottom surface portion 32 is moved upwardly. As a result, as shown in FIG. 14, the openable bottom surface portion 32 is returned to the closed state. At this time, the key portion 65B of the lever 65 is latched by the lock portion 66.

With this mechanism, when the display unit 3 is opened once at an angle of 90° or more and thereby the openable bottom surface portion 32 is full opened as shown in FIG. 10, even if the opening/closing angle of the display unit 3 is changed, the opened state of the openable bottom surface portion 32 is not changed. As a result, even if the opening/closing angle of the display unit 2 is changed, the space P shown in FIG. 5A can be ensured, to thereby sufficiently suppress the temperature rise of the whole main body 2.

Figure 15:
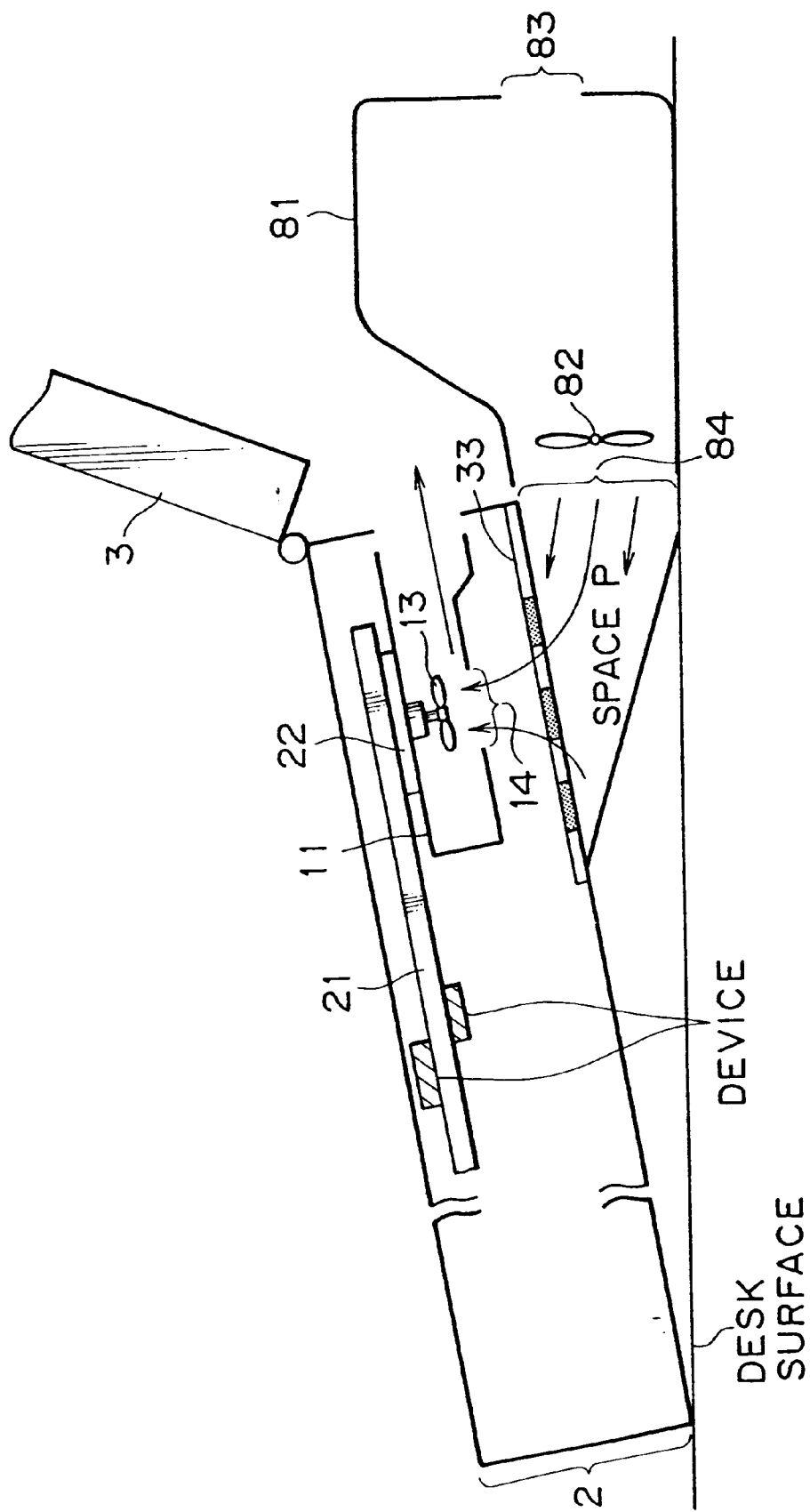
FIG. 15 is a view showing a docking station having a cooling mechanism.

Next, the case of making use of a docking station 81 having a cooling mechanism will be described with reference to FIG. 15. The docking station 81 shown in FIG. 15 has a fan 82, an air inlet 83, and an air outlet 84. Outside air sucked in the docking station 81 from the air inlet 83 is fed to the opening portion of the openable bottom surface portion 32 via the air outlet 84 by rotation of the fan 82. With this mechanism, a large amount of air is sucked in the cooling unit 11 from the air inlet 14.

Figure 16B:
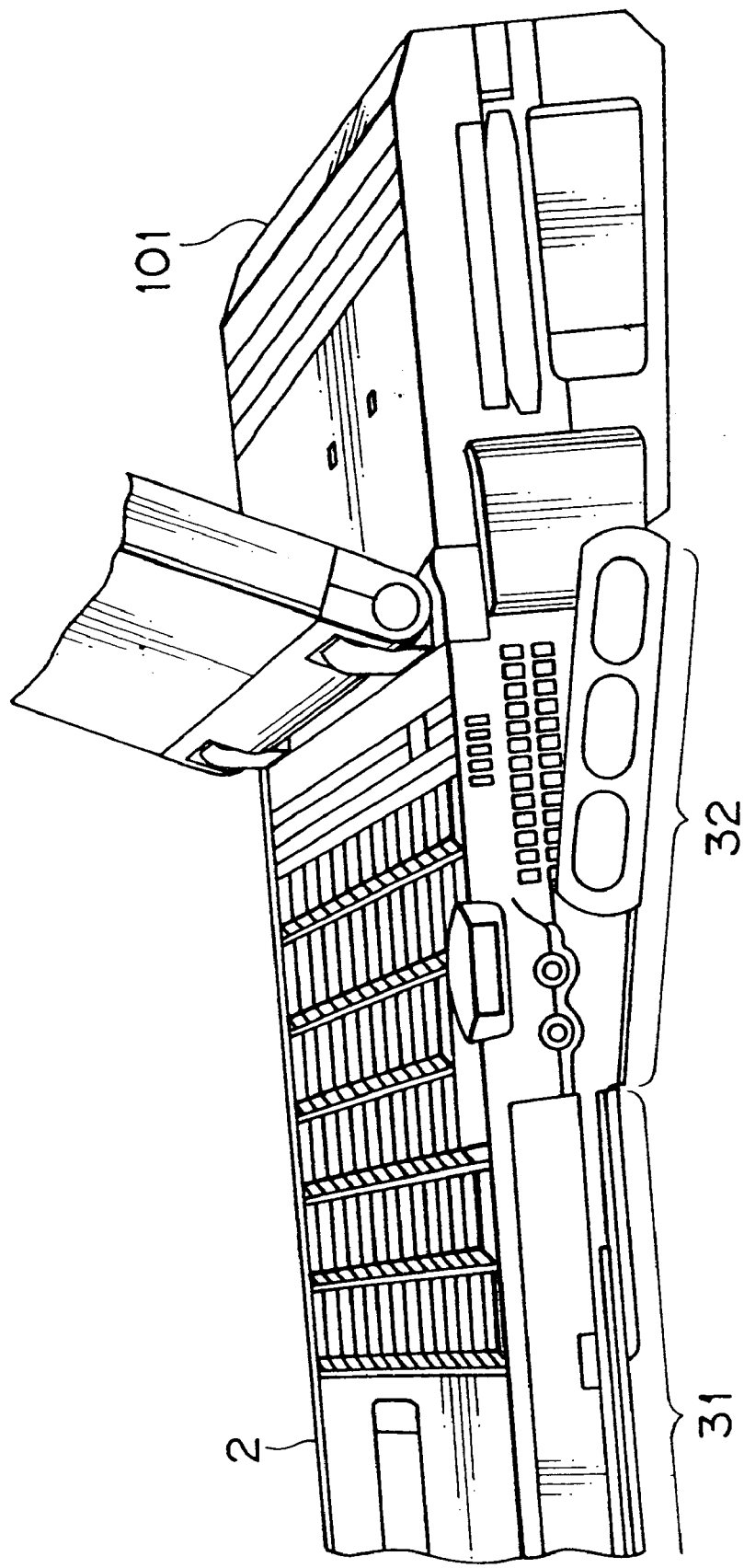

A main body 2 shown in FIGS. 16A and 16B has a thermal conductor 91 mounted on a thermal conductor 22, in place of the cooling unit 11. A docking station 101 shown in FIGS. 16A and 16B includes a heat sink 102 and an air outlet 103. Heat generated from the devices is transferred to the heat sink 102 of the docking station 101 via the board 21 and the thermal conductor 22. The heat thus transferred to the heat sink 102 is discharged from the air outlet 103 via the air in the docking station 101.

In this way, by combining the docking station 81 or 101 with the personal computer 30 to which the present invention is applied, it is possible to more effectively cool the inside of the main body 2 and hence to sufficiently suppress the temperature rise of the whole main body 2.

Second Embodiment

Figures 17A, 17B:
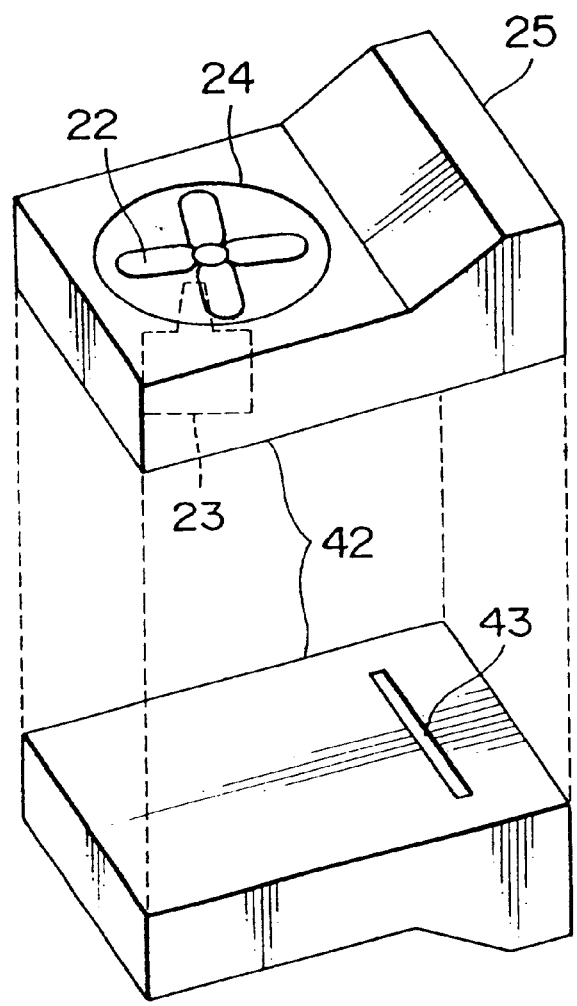
FIGS. 17A and 17B are configuration views of an appearance of a cooling unit to which the present invention is applied.

FIGS. 17A and 17B are configuration views showing an appearance of a cooling unit 41 to which the present invention is applied. It should be noted that parts corresponding to those shown in FIG. 24 are designated by the same characters and the overlapped description thereof is omitted. In this embodiment, as show by FIG. 17B which is a bottom view of the cooling unit 41, an air inlet 43 is provided in the bottom surface of a housing 42 at a position on an air outlet 25 side.

Figure 18:
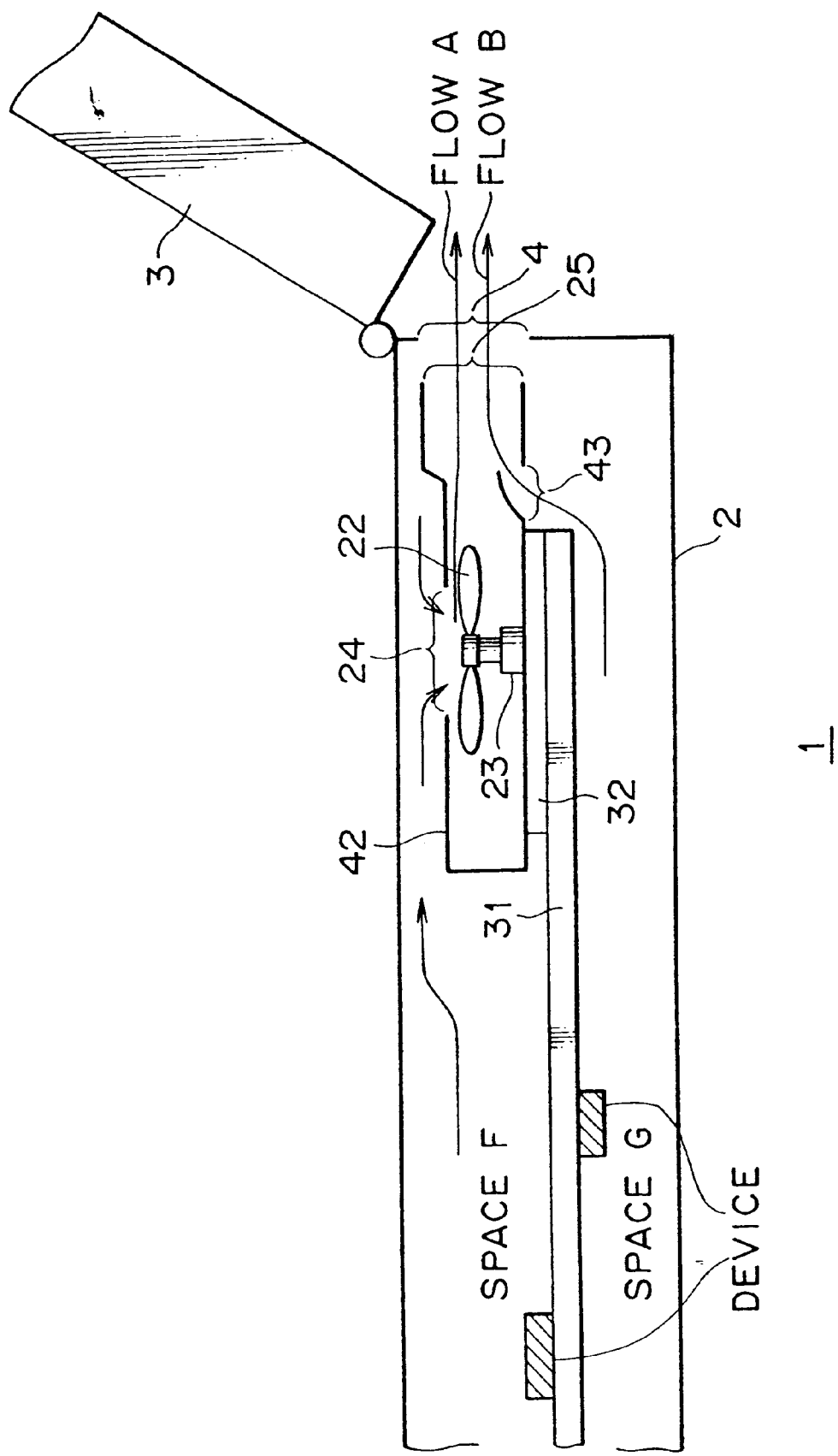
FIG. 18 is a sectional view of the cooling unit shown in FIGS. 17A and 17B, which is mounted in the main body of the personal computer.

FIG. 18 is a sectional view of the cooling unit 41 mounted a main body 2 of a personal computer 30. The cooling function of the cooling unit 41 will be described with reference to FIG. 18.

In the cooling unit 41, a board 31 and a space F are cooled in accordance with the same first and second cooling functions as those of the related art cooling unit 11, and the overlapped description thereof is omitted.

Next, a third cooling function for a space G will be described. When the fan 22 of the cooling unit 41 is rotated, air from a space (including the space F) over the air inlet 24 of the cooling unit 41 is first sucked in the cooling unit 41 from the air inlet 24, and is discharged via the air outlet 25 of the cooling unit 41 and an air outlet 4 of the main body 2 as shown by a flow A shown in FIG. 18.

When there occurs the flow A, a pressure in the housing 42, typically, near the air inlet 43 is reduced on the basis of the Bernoulli's theorem, so that air in a space (including the space G) under the board 31 is sucked in the cooling unit 41 from the air inlet 43. The air thus sucked is discharged via the air outlets 25 and 4 as shown by a flow B shown in FIG. 18. In this way, the space G is cooled.

In the cooling unit 41, by the third cooling function in addition to the first and second cooling functions, the inside of the main body 2 is cooled, to thereby sufficiently suppress the temperature rise of the whole main body 2.

Figure 19:
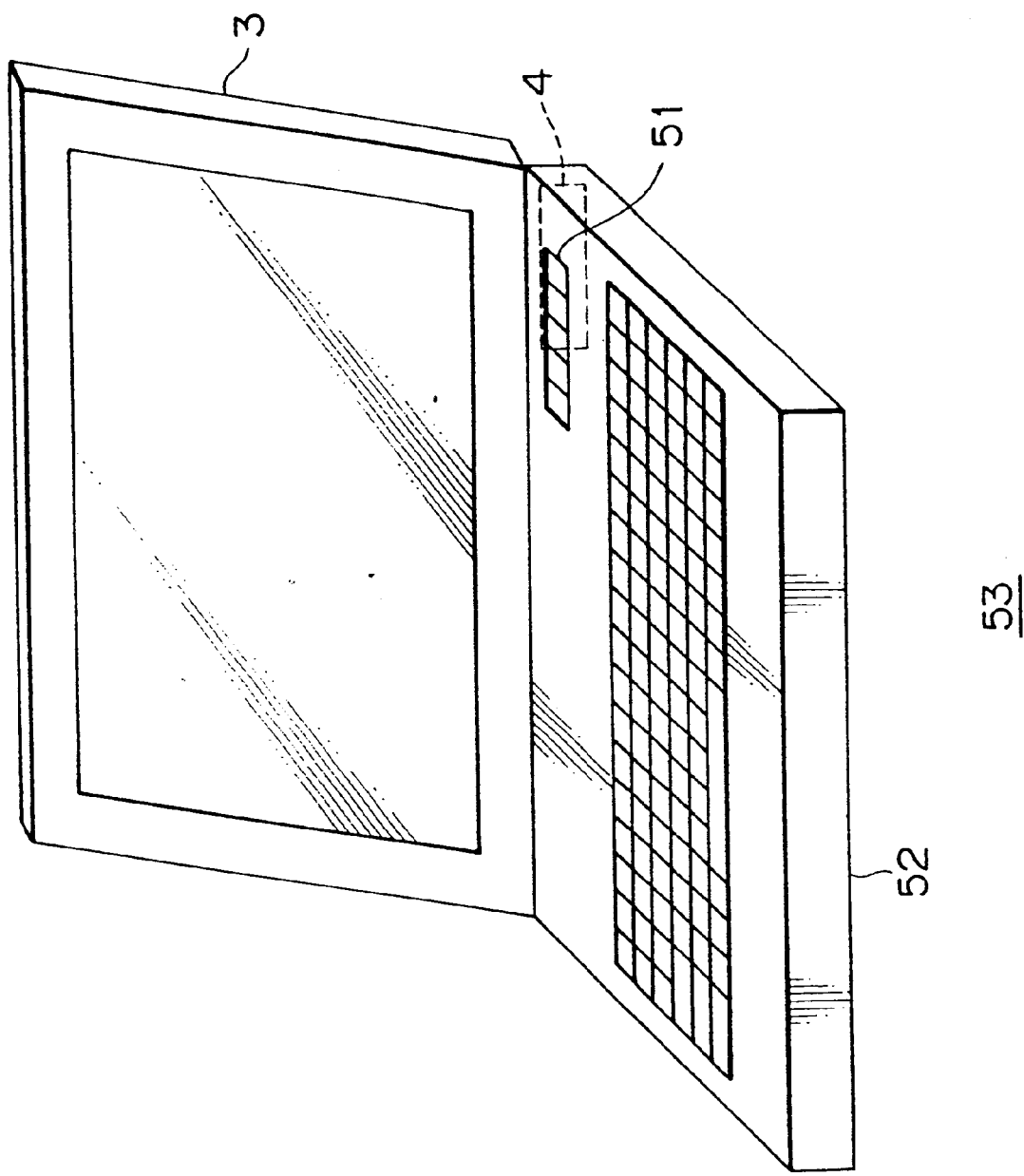
FIG. 19 is a view showing a personal computer in which an air inlet is provided in a main body.

While in the above embodiment, the present invention is applied to the personal computer 1 in which only the air outlet 4 is provided but any air inlet is not provided, the present invention can be also applied to a personal computer 53 shown in FIG. 19 in which an air inlet 51 is provided in a main body 52.

Figure 20:
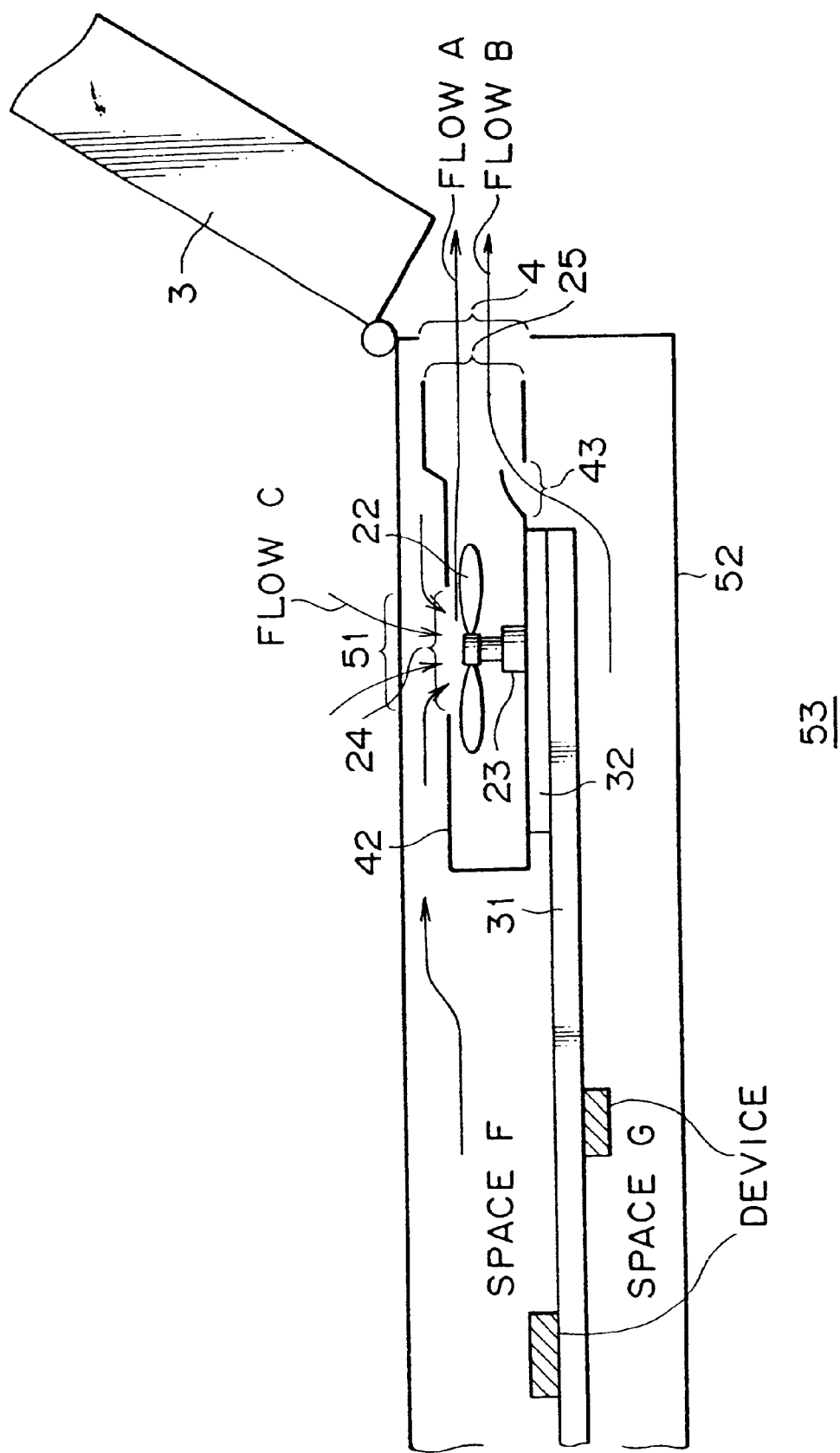
FIG. 20 is a sectional view of the cooling unit shown in FIGS. 17A and 17B, which is mounted in the main body of the personal computer shown in FIG. 19.

FIG. 20 is a sectional view of the cooling unit 41 mounted in the main body 52 of the personal computer 53. In this case, in addition to the flows A and B, air sucked in the main body 52 via the air inlet 51 is discharged via the air inlet 24 and the air outlet 25 of the cooling unit 41 and the air outlet 4 of the main body 52.

Figure 21:
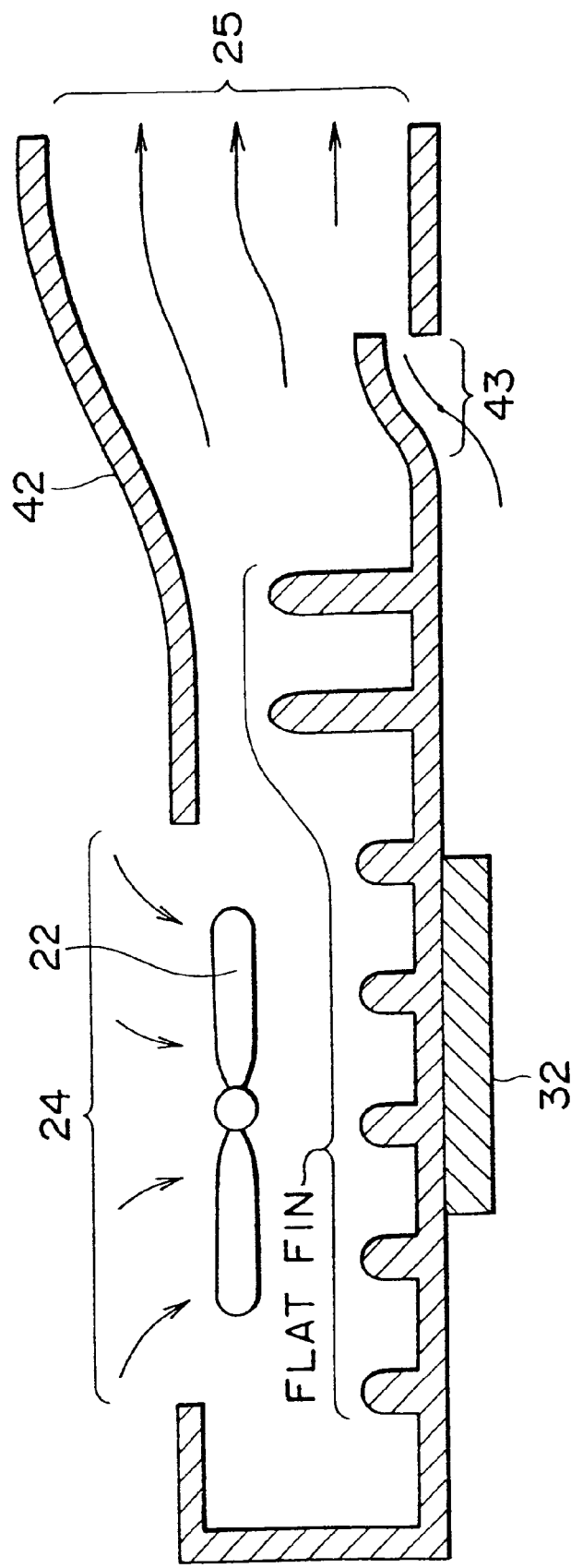
FIG. 21 is the cooling unit shown in FIGS. 17A and 17B in which flat fins are mounted.

As shown in FIG. 21, the cooling unit 41 having a housing 42 in which flat fins are mounted may be mounted in the personal computer 1 or 53.

Figure 22:
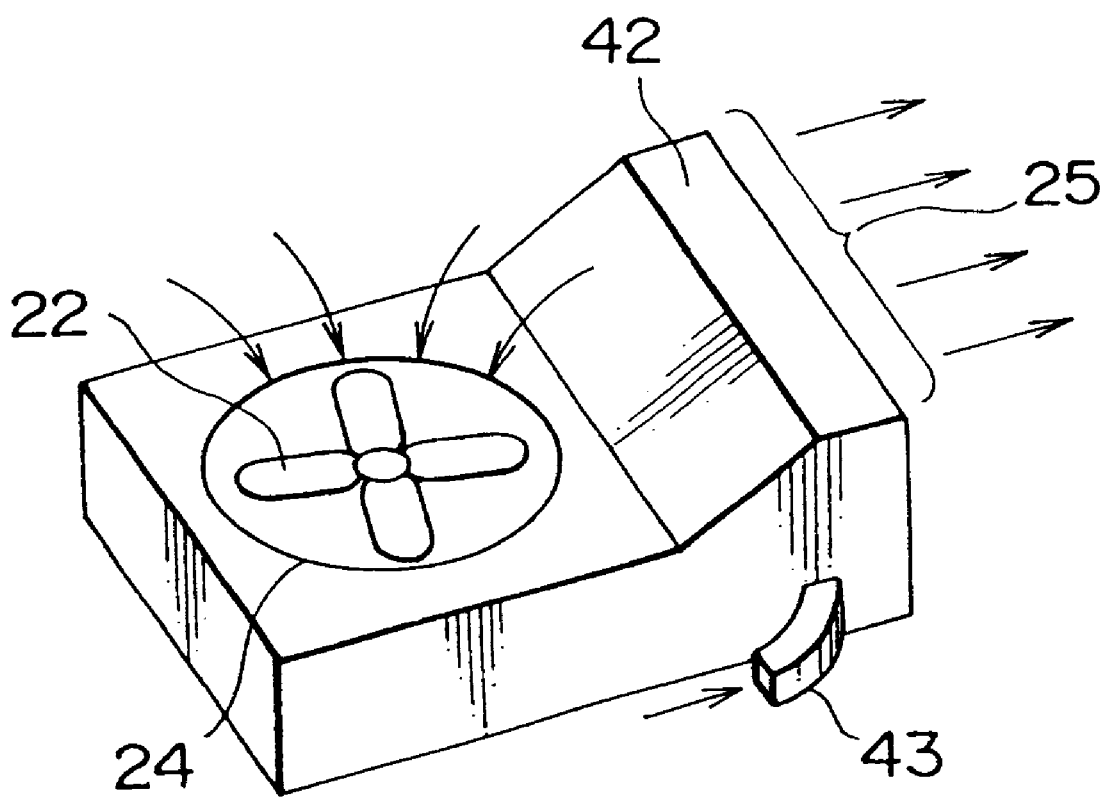
FIG. 22 is a configuration view of the cooling unit, shown in FIGS. 17A and 17B, in which the air inlet is provided in a side surface.

While in the above description, the air inlet 43 is provided in the bottom surface of the housing, 42 of the cooling unit 41, the present invention is not limited thereto, and as shown in FIG. 22, the air inlet 43 may be mounted in a side surface of the housing 42.

In the above embodiment, the cooling unit 41 is mounted on the thermal conductor 32, it may be directly mounted on the devices. Further, the air outlet 4 may be mounted not only in the back surface of the main body 2 or 52 but also in the right or left side surface of the main body 2 or 52.

While the preferred embodiments of the present invention have been described using the specific terms, such description is for illustrative purposes only, and it is to be understood that changes and variations may be made without departing from the spirit or scope of the following claims.

What is claimed is:

1. A cooling device for a computer housing having a main body and a display unit connected thereto, said cooling device comprising:

means for sucking a first gas through a first air inlet of the cooling device;

means for discharging said first gas sucked by said sucking means through a gas discharge outlet provided on a side of the cooling device; and means for sucking a second gas by the action of said first gas discharged by said discharging means through a second air inlet provided in a bottom surface of the cooling device at a position on the side of the gas discharge outlet and discharging said second gas through the same gas discharge outlet as the first gas is discharged so that a temperature rise of the main body is suppressed.

2. A cooling method for cooling a main body portion of a computer housing by a cooling device, said cooling method comprising the steps of:

sucking a first gas through a first air inlet of the cooling device;

discharging said first gas sucked at said sucking step through a gas discharge outlet provided in a side of the cooling device;

sucking a second gas by the action of said first gas discharged at said discharging step through a second air inlet provided in a bottom surface of the cooling device at a position on the side of the gas discharge outlet; and discharging said second gas through the same gas discharge outlet as the first gas is discharged so that a temperature rise of the main body is suppressed.

3. An electronic apparatus having a cooling device for suppressing a temperature rise of a main body of the electronic apparatus, said electronic apparatus comprising:

means for sucking a first gas through a first air inlet of the cooling device;

means for discharging said first gas sucked by said sucking means through a gas discharge outlet provided in a side of the cooling device;

means for sucking a second gas by the action of said first gas discharged by said discharging means through a second air inlet provided in a bottom surface of the cooling device at a position on the side of the gas discharge outlet; and discharging said second gas through the same gas discharge outlet as the first gas is discharged.

* * * * *